US012573716B2

(12) United States Patent
Ogihara et al.

(10) Patent No.: US 12,573,716 B2
(45) Date of Patent: Mar. 10, 2026

(54) COMPOSITION FOR ELECTROCHEMICAL DEVICE FUNCTIONAL LAYER, LAMINATE FOR ELECTROCHEMICAL DEVICE, AND ELECTROCHEMICAL DEVICE

(71) Applicant: ZEON CORPORATION, Tokyo (JP)

(72) Inventors: Tasuku Ogihara, Tokyo (JP); Takuya Kaneda, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 677 days.

(21) Appl. No.: 17/906,345

(22) PCT Filed: Mar. 15, 2021

(86) PCT No.: PCT/JP2021/010441

§ 371 (c)(1),
(2) Date: Sep. 15, 2022

(87) PCT Pub. No.: WO2021/200083

PCT Pub. Date: Oct. 7, 2021

(65) Prior Publication Data

US 2023/0178751 A1 Jun. 8, 2023

(30) Foreign Application Priority Data

Mar. 31, 2020 (JP) ................................ 2020-064857

(51) Int. Cl.

| | |
|---|---|
| ***H01M 50/443*** | (2021.01) |
| ***H01G 11/24*** | (2013.01) |
| ***H01G 11/30*** | (2013.01) |
| ***H01M 4/62*** | (2006.01) |
| ***H01M 50/414*** | (2021.01) |
| ***H01M 50/42*** | (2021.01) |
| ***H01M 50/431*** | (2021.01) |
| ***H01M 50/446*** | (2021.01) |
| *H01M 50/434* | (2021.01) |

(52) U.S. Cl.

CPC .......... *H01M 50/443* (2021.01); *H01G 11/24* (2013.01); *H01G 11/30* (2013.01); *H01M 4/622* (2013.01); *H01M 4/628* (2013.01); *H01M 50/414* (2021.01); *H01M 50/42* (2021.01); *H01M 50/431* (2021.01); *H01M 50/446* (2021.01); *H01M 50/434* (2021.01); *Y02E 60/10* (2013.01)

(58) Field of Classification Search

CPC ... H01M 50/443; H01M 4/622; H01M 50/178

See application file for complete search history.

(56) References Cited

U.S. PATENT DOCUMENTS

| | | | | |
|---|---|---|---|---|
| 9,748,547 | B2 | 8/2017 | Murase et al. | |
| 10,840,495 | B2 | 11/2020 | Sugimoto | |
| 11,081,699 | B2 | 8/2021 | Masuda | |
| 2015/0311490 | A1 | 10/2015 | Murase et al. | |
| 2017/0155107 | A1* | 6/2017 | Akiike | H01M 50/403 |
| 2017/0155114 | A1* | 6/2017 | Kurakane | C08J 5/18 |
| 2017/0210855 | A1* | 7/2017 | Wang | H01M 4/13 |
| 2018/0053963 | A1* | 2/2018 | Tanaka | H01M 10/0525 |
| 2019/0260017 | A1* | 8/2019 | Yoo | H01M 10/0525 |
| 2020/0052270 | A1 | 2/2020 | Sugimoto | |
| 2020/0052271 | A1* | 2/2020 | Sugimoto | H01M 50/443 |
| 2020/0067047 | A1 | 2/2020 | Sugimoto | |

FOREIGN PATENT DOCUMENTS

| | | | |
|---|---|---|---|
| CN | 104769753 | A | 7/2015 |
| CN | 106233510 | A | 12/2016 |
| CN | 110383531 | A | 10/2019 |
| JP | 2019192340 | A * | 10/2019 |
| WO | 2018034093 | A1 | 2/2018 |
| WO | 2018034094 | A1 | 2/2018 |

OTHER PUBLICATIONS

Jiga, Inc. Polypropylene Glass Transition Temperature. [online]. Apr. 19, 2025 [retrieved on Aug. 29, 2025]. Retrieved from <https://jiga.io/articles/polypropylene-glass-transition-temperature/#elementor-toc_heading-anchor-2>. (Year: 2025).*

May 25, 2021, International Search Report issued in the International Patent Application No. PCT/JP2021/010441.

Sep. 29, 2022, International Preliminary Report on Patentability issued in the International Patent Application No. PCT/JP2021/010441.

Apr. 16, 2025, the Extended European Search Report issued by the European Patent Office in the corresponding European Patent Application No. 21781153.8.

* cited by examiner

*Primary Examiner* — Melvin C. Mayes

(74) *Attorney, Agent, or Firm* — KENJA IP LAW PC

(57) ABSTRACT

Provided is a composition for an electrochemical device functional layer with which it is possible to form a functional layer for an electrochemical device that can impart excellent process adhesiveness and blocking resistance to an electrochemical device member such as an electrode or a separator and that can cause an electrochemical device to display excellent electrochemical characteristics. The composition for an electrochemical device functional layer contains a particulate polymer and a binder. The particulate polymer has a molecular weight distribution (weight-average molecular weight (Mw)/number-average molecular weight (Mn)) of not less than 1.0 and not more than 3.0.

9 Claims, No Drawings

COMPOSITION FOR ELECTROCHEMICAL DEVICE FUNCTIONAL LAYER, LAMINATE FOR ELECTROCHEMICAL DEVICE, AND ELECTROCHEMICAL DEVICE

TECHNICAL FIELD

The present disclosure relates to a composition for an electrochemical device functional layer, a laminate for an electrochemical device, and an electrochemical device.

BACKGROUND

Electrochemical devices such as lithium ion secondary batteries and electric double-layer capacitors have characteristics such as compact size, light weight, high energy-density, and the ability to be repeatedly charged and discharged, and are used in a wide variety of applications.

A lithium ion secondary battery, for example, generally includes battery members such as a positive electrode, a negative electrode, and a separator that isolates the positive electrode and the negative electrode from each other and prevents short-circuiting between the positive and negative electrodes. There are cases in which a porous membrane layer for improving heat resistance and strength, an adhesive layer aimed at improving adhesiveness between battery members, or the like (hereinafter, such layers are also referred to collectively using the term "functional layer") is provided at the surface of an electrode and/or a separator. More specifically, an electrode that is obtained by further forming a functional layer on an electrode substrate that includes an electrode mixed material layer on a current collector or a separator that is obtained by forming a functional layer on a separator substrate may be used as a battery member. A functional layer is formed by applying a composition for a functional layer onto a substrate and then drying the applied composition for a functional layer.

In recent years, much effort has been directed toward improving functional layers with the aim of achieving even higher performance of electrochemical devices such as lithium ion secondary batteries (for example, Patent Literature (PTL) 1 and 2).

More specifically, PTL 1 proposes a technique of including a particulate polymer having a prescribed chemical composition and properties in a composition for a non-aqueous secondary battery functional layer. PTL 1 reports that the inclusion of such a particulate polymer in a composition for a functional layer can increase adhesiveness of an obtained functional layer and improve battery performance.

Moreover, PTL 2 proposes a technique of including a particulate polymer having prescribed properties and inorganic particles in a composition for a porous membrane of a non-aqueous secondary battery. PTL 2 reports that the inclusion of such a particulate polymer having prescribed properties and inorganic particles in a composition for a porous membrane of a non-aqueous secondary battery can improve heat shrinkage resistance of an obtained porous member (functional layer) and can thereby improve battery performance.

CITATION LIST

Patent Literature

PTL 1: WO2018/034093A1

PTL 2: WO2018/034094A1

SUMMARY

Technical Problem

In a production process of an electrochemical device such as a lithium ion secondary battery, electrochemical device members that have not yet been immersed in electrolyte solution may be stacked by roll pressing or the like and may then be cut to a desired size as necessary or be transported in the form of a laminate. During this cutting or transportation, misalignment or the like of the stacked electrochemical device members may occur, leading to problems such as the occurrence of faults and reduction of productivity. Therefore, it is desirable for an electrochemical device member to display performance in terms of adhering electrochemical device members to each other in a production process of an electrochemical device (i.e., process adhesiveness).

On the other hand, in a production process of an electrochemical device such as a lithium ion secondary battery, an electrochemical device member that has been produced in an elongated form is typically wound up and then stored and transported in that form. However, when an electrochemical device member that includes a functional layer is stored and transported in a wound up state, electrochemical device members that are adjacent to each other with the functional layer in-between may become stuck together (i.e., blocking may occur), leading to the occurrence of faults and reduction of productivity. Therefore, it is desirable for an electrochemical device member including a functional layer to ensure process adhesiveness described above while, on the other hand, having performance in terms of inhibiting blocking (i.e., blocking resistance) during storage and transportation and also in a production process.

However, there is room for improvement of functional layers according to the techniques cited above in terms of achieving a balance of high levels of blocking resistance and process adhesiveness between electrochemical device members of an electrochemical device such as a lithium ion secondary battery. There is also room for improvement of electrochemical characteristics (internal resistance characteristics and cycle characteristics) of an electrochemical device that is produced using such a functional layer.

Accordingly, an object of the present disclosure is to provide a technique relating to a functional layer for an electrochemical device that can impart excellent process adhesiveness and blocking resistance to an electrochemical device member such as an electrode or a separator and that can cause an electrochemical device to display excellent electrochemical characteristics.

Solution to Problem

The inventors conducted diligent investigation with the aim of solving the problems described above. The inventors discovered that by using a binder and a particulate polymer having a specific property in combination, it is possible to obtain a composition for an electrochemical device functional layer with which it is possible to form a functional layer for an electrochemical device that can impart excellent process adhesiveness and blocking resistance to an electrochemical device member such as an electrode or a separator, and it is also possible to improve electrochemical characteristics (particularly internal resistance characteristics and cycle characteristics) of an electrochemical device that includes a functional layer formed using this composition for a functional layer. In this manner, the inventors completed the present disclosure.

Specifically, the present disclosure aims to advantageously solve the problem set forth above, and a presently disclosed composition for an electrochemical device functional layer comprises a particulate polymer and a binder, wherein the particulate polymer has a molecular weight distribution, expressed by weight-average molecular weight (Mw)/number-average molecular weight (Mn), of not less than 1.0 and not more than 3.0. By including a binder and a particulate polymer having a molecular weight distribution that is within a specific range in a composition for an electrochemical device functional layer in this manner, the obtained composition for an electrochemical device functional layer can form a functional layer for an electrochemical device that can impart excellent process adhesiveness and blocking resistance to an electrochemical device member such as an electrode or a separator. Moreover, electrochemical characteristics (internal resistance characteristics and cycle characteristics) of an electrochemical device that includes a functional layer formed using this composition for an electrochemical device functional layer can be improved.

Note that the weight-average molecular weight (Mw) and number-average molecular weight (Mn) of a particulate polymer referred to in the present disclosure can be measured by a method described in the EXAMPLES section.

In the presently disclosed composition for an electrochemical device functional layer, the particulate polymer preferably includes a dithioester structure. When the particulate polymer includes a dithioester structure, process adhesiveness and blocking resistance of an electrochemical device member that includes an obtained functional layer can be further improved.

In the presently disclosed composition for an electrochemical device functional layer, the particulate polymer preferably has a glass-transition temperature of not lower than 25° C. and not higher than 90° C. When the glass-transition temperature of the particulate polymer is not lower than 25° C. and not higher than 90° C., a good balance of process adhesiveness and blocking resistance can be achieved in an electrochemical device member that includes an obtained functional layer.

Note that the glass-transition temperature of a particulate polymer referred to in the present disclosure can be measured by a method described in the EXAMPLES section.

In the presently disclosed composition for an electrochemical device functional layer, the particulate polymer preferably includes a (meth)acrylic acid ester monomer unit. When the particulate polymer includes a (meth)acrylic acid ester monomer unit, process adhesiveness of an electrochemical device member that includes an obtained functional layer can be further improved.

Note that when a polymer is said to "include a monomer unit" in the present disclosure, this means that "a polymer obtained using that monomer includes a structural unit derived from the monomer".

In the presently disclosed composition for an electrochemical device functional layer, the binder is preferably formed of a polymer that includes a (meth)acrylic acid ester monomer unit. When the binder is formed of a polymer that includes a (meth)acrylic acid ester monomer unit, process adhesiveness of an electrochemical device member that includes an obtained functional layer can be further improved.

The presently disclosed composition for an electrochemical device functional layer preferably further comprises non-conductive heat-resistant particles. When the composition for an electrochemical device functional layer further contains non-conductive heat-resistant particles, heat resistance can be imparted to an obtained functional layer.

In the presently disclosed composition for an electrochemical device functional layer, the non-conductive heat-resistant particles preferably include inorganic particles. When the non-conductive heat-resistant particles include inorganic particles, heat resistance of an obtained functional layer can be even further improved.

In the presently disclosed composition for an electrochemical device functional layer, the inorganic particles preferably contain at least one selected from the group consisting of alumina, boehmite, barium sulfate, and magnesium hydroxide. When the inorganic particles include at least one selected from the group consisting of alumina, boehmite, barium sulfate, and magnesium hydroxide, heat resistance of an obtained functional layer can be even further improved.

Moreover, the present disclosure aims to advantageously solve the problem set forth above, and a presently disclosed laminate for an electrochemical device comprises: a substrate; and a functional layer for an electrochemical device formed on the substrate, wherein the functional layer for an electrochemical device is formed using any one of the compositions for an electrochemical device functional layer set forth above. In this manner, it is possible to provide a laminate for an electrochemical device including a functional layer for an electrochemical device that can impart excellent process adhesiveness and blocking resistance to an electrochemical device member such as an electrode or a separator and that can cause an electrochemical device to display excellent electrochemical characteristics.

Furthermore, the present disclosure aims to advantageously solve the problem set forth above, and a presently disclosed electrochemical device comprises the laminate for an electrochemical device set forth above. Through an electrochemical device including the presently disclosed laminate for an electrochemical device in this manner, it is possible to provide an electrochemical device that can display excellent electrochemical characteristics.

Advantageous Effect

According to the present disclosure, it is possible to provide a composition for an electrochemical device functional layer with which it is possible to form a functional layer for an electrochemical device that can impart excellent process adhesiveness and blocking resistance to an electrochemical device member such as an electrode or a separator and that can cause an electrochemical device to display excellent electrochemical characteristics.

Moreover, according to the present disclosure, it is possible to provide a laminate for an electrochemical device including a functional layer for an electrochemical device that can impart excellent process adhesiveness and blocking resistance to an electrochemical device member such as an electrode or a separator and that can cause an electrochemical device to display excellent electrochemical characteristics.

Furthermore, according to the present disclosure, it is possible to provide an electrochemical device that can display excellent electrochemical characteristics.

DETAILED DESCRIPTION

The following provides a detailed description of embodiments of the present disclosure.

The presently disclosed composition for an electrochemical device functional layer may be used as a material in production of a functional layer for an electrochemical device. The presently disclosed laminate for an electrochemical device is produced using the presently disclosed composition for an electrochemical device functional layer and can be used, for example, as an electrochemical device member. Moreover, the presently disclosed electrochemical device includes at least the presently disclosed laminate for an electrochemical device as an electrochemical device member.

(Composition for Electrochemical Device Functional Layer)

The presently disclosed composition for an electrochemical device functional layer (hereinafter, also referred to simply as a "composition for a functional layer") contains a particulate polymer and a binder and may optionally contain other components.

<Particulate Polymer>

The particulate polymer contained in the presently disclosed composition for a functional layer is required to have a molecular weight distribution (value obtained by dividing the weight-average molecular weight (Mw) of the particulate polymer by the number-average molecular weight (Mn) of the particulate polymer) of not less than 1.0 and not more than 3.0. Through the molecular weight distribution being within the range set forth above, an electrochemical device member that includes an obtained functional layer has excellent process adhesiveness and blocking resistance. Moreover, an electrochemical device that includes this functional layer displays excellent battery chemistry characteristics.

From a viewpoint of further improving process adhesiveness and blocking resistance of an electrochemical device member including a functional layer and further improving electrochemical characteristics of an electrochemical device including this functional layer, the molecular weight distribution of the particulate polymer is preferably 2.0 or less, more preferably 1.5 or less, and even more preferably 1.3 or less.

Although it is not necessarily certain why excellent process adhesiveness and blocking resistance can be imparted to an electrochemical device member that includes an obtained functional layer and why an electrochemical device including the functional layer can be caused to display excellent battery chemistry characteristics when the molecular weight distribution (Mw/Mn) of the particulate polymer has a value of not less than 1.0 and not more than 3.0, the reason for this is presumed to be as follows.

Specifically, when the molecular weight distribution (Mw/Mn) of the particulate polymer has a value of not less than 1.0 and not more than 3.0, blocking of an electrochemical device member that includes a functional layer is thought to have a low tendency to occur due to there being few low molecular weight components acting as tacky components in molecule clusters of the particulate polymer. It is also thought that when few low molecular weight components are present, there is a low tendency for swollen particulate polymer to elute in electrolyte solution in an electrochemical device, and thus the formation of a coating film by eluted particulate polymer can be inhibited, and an increase of internal resistance of the electrochemical device can be suppressed. Moreover, when the molecular weight distribution (Mw/Mn) of the particulate polymer has a value of not less than 1.0 and not more than 3.0, few high molecular weight components that are not easily softened by heating are present in molecule clusters of the particulate polymer, and thus adhesiveness can be expressed by an electrochemical device member that includes a functional layer, and process adhesiveness improves. Furthermore, when few high molecular weight components are present, an electrochemical device member can maintain adhesive strength in electrolyte solution, and thus gas escape properties improve, and deposition of ion conductors such as lithium ions is less likely to occur. This is thought to inhibit deterioration of electrochemical characteristics of an electrochemical device. It is presumed that for reasons such as set forth above, a balance of high levels of process adhesiveness and blocking resistance can be achieved, and electrochemical characteristics of an electrochemical device can be improved.

The molecular weight distribution (Mw/Mn) of the particulate polymer can be more suitably controlled by adding a subsequently described chain transfer agent in production of the particulate polymer, for example. More specifically, the molecular weight distribution of the particulate polymer can be controlled through appropriate adjustment of the type, additive amount, and/or number of additions of the chain transfer agent in production of the particulate polymer.

<<Weight-Average Molecular Weight (Mw) of Particulate Polymer>>

The weight-average molecular weight (Mw) of the particulate polymer is preferably 20,000 or more, more preferably 50,000 or more, even more preferably 80,000 or more, and further preferably 100,000 or more, and is preferably 500,000 or less, more preferably 300,000 or less, and even more preferably 200,000 or less.

When the weight-average molecular weight of the particulate polymer is not less than any of the lower limits set forth above, blocking resistance of an electrochemical device member such as a separator or an electrode that includes an obtained functional layer further improves. Moreover, when the weight-average molecular weight of the particulate polymer is not more than any of the upper limits set forth above, process adhesiveness of an electrochemical device member such as a separator or an electrode that includes an obtained functional layer further improves.

The weight-average molecular weight of the particulate polymer can be obtained as a standard polystyrene-equivalent value by gel permeation chromatography (GPC).

<<Glass-Transition Temperature (Tg) of Particulate Polymer>>

The glass-transition temperature (Tg) of the particulate polymer is preferably 25° C. or higher, more preferably 30° C. or higher, and even more preferably 35° C. or higher, and is preferably lower than the glass-transition temperature of organic particles serving as subsequently described non-conductive heat-resistant particles, more preferably 90° C. or lower, and even more preferably 80° C. or lower. When the glass-transition temperature of the particulate polymer is not lower than any of the lower limits set forth above, blocking of an electrochemical device member that includes an obtained functional layer can be further inhibited. On the other hand, when the glass-transition temperature of the particulate polymer is 90° C. or lower, process adhesiveness of an electrochemical device member that includes an obtained functional layer can be further improved.

<<Volume-Average Particle Diameter of Particulate Polymer>>

The volume-average particle diameter of the particulate polymer in the composition for a functional layer is preferably 0.1 μm or more, more preferably 0.5 μm or more, even more preferably 1.0 μm or more, particularly preferably 2.5 μm or more, and most preferably 5.0 μm or more, and is preferably 10.0 μm or less, more preferably 9.0 μm or less, and even more preferably 8.0 μm or less.

When the volume-average particle diameter of the particulate polymer is not less than any of the lower limits set forth above, it is easier for the particulate polymer to protrude from the surface of a layer of non-conductive heat-resistant particles in an obtained functional layer in a case in which the composition for a functional layer contains subsequently described non-conductive heat-resistant particles. Consequently, even better process adhesiveness can be displayed by an electrochemical device member that includes the functional layer. Moreover, when the volume-average particle diameter of the particulate polymer is not more than any of the upper limits set forth above, particles of the particulate polymer have a lower tendency to detach from the layer of non-conductive heat-resistant particles, and reduction of process adhesiveness can be further inhibited.

Note that the volume-average particle diameter of a particulate polymer referred to in the present disclosure can be measured by a method described in the EXAMPLES section.

<<Chemical Composition of Particulate Polymer>>

The chemical composition of the particulate polymer contained in the presently disclosed composition for a functional layer is not specifically limited so long as the desired effects are obtained. Accordingly, the particulate polymer can, for example, be a known polymer that can be used as a particulate polymer in production of a functional layer for an electrochemical device.

Examples of monomer units forming the particulate polymer include a (meth)acrylic acid ester monomer unit and an aromatic vinyl monomer unit. Although the particulate polymer may include one type of monomer unit among these monomer units or may include two or more types of monomer units among these monomer units in a freely selected ratio, it is preferable that the particulate polymer includes at least a (meth)acrylic acid ester monomer unit. Note that in the present disclosure, "(meth)acryl" is used to indicate "acryl" and/or "methacryl".

[(Meth)Acrylic Acid Ester Monomer Unit]

Examples of (meth)acrylic acid ester monomers that can form a (meth)acrylic acid ester monomer unit include acrylic acid alkyl esters such as methyl acrylate, ethyl acrylate, n-propyl acrylate, isopropyl acrylate, butyl acrylate (n-butyl acrylate, t-butyl acrylate, etc.), pentyl acrylate, hexyl acrylate, heptyl acrylate, octyl acrylate (2-ethylhexyl acrylate, etc.), nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, butyl methacrylate (n-butyl methacrylate, t-butyl methacrylate, etc.), pentyl methacrylate, hexyl methacrylate, heptyl methacrylate, octyl methacrylate (2-ethylhexyl methacrylate, etc.), nonyl methacrylate, decyl methacrylate, lauryl methacrylate, n-tetradecyl methacrylate, and stearyl methacrylate. Of these (meth)acrylic acid ester monomers, n-butyl acrylate, 2-ethylhexyl acrylate, and methyl methacrylate are preferable, and n-butyl acrylate is more preferable.

Note that one of these (meth)acrylic acid ester monomers may be used individually, or two or more of these (meth) acrylic acid ester monomers may be used in combination in a freely selected ratio.

The proportional content of (meth)acrylic acid ester monomer units in the particulate polymer when all repeating units of the particulate polymer are taken to be 100 mass % is preferably 5 mass % or more, and more preferably 10 mass % or more, and is preferably 65 mass % or less, and more preferably 60 mass % or less. When the proportional content of (meth)acrylic acid ester monomer units is not more than any of the upper limits set forth above, blocking resistance of an electrochemical device member that includes an obtained functional layer can be improved. On the other hand, when the proportional content of (meth) acrylic acid ester monomer units is not less than any of the lower limits set forth above, good close adherence of a functional layer and a substrate can be achieved.

Note that the "proportional content" of each "monomer unit" referred to in the present disclosure can be measured by a nuclear magnetic resonance (NMR) method such as $^1$H-NMR.

[Aromatic Vinyl Monomer Unit]

The inclusion of an aromatic vinyl monomer unit in the particulate polymer improves elasticity of the particulate polymer and can increase the strength of a functional layer.

Examples of aromatic vinyl monomers that can form an aromatic vinyl monomer unit include, but are not specifically limited to, styrene, α-methylstyrene, styrene sulfonic acid, butoxystyrene, and vinylnaphthalene, of which, styrene is preferable.

Note that one of these aromatic vinyl monomers may be used individually, or two or more of these aromatic vinyl monomers may be used in combination in a freely selected ratio.

The proportional content of aromatic vinyl monomer units in the particulate polymer when all monomer units in the particulate polymer are taken to be 100 mass % is preferably 30 mass % or more, and more preferably 60 mass % or more, and is preferably 90 mass % or less, and more preferably 85 mass % or less. When the proportional content of aromatic vinyl monomer units is not less than any of the lower limits set forth above, elasticity of the particulate polymer improves, strength of an obtained functional layer is ensured, and close adherence of the functional layer with a substrate can be increased. On the other hand, when the proportional content of aromatic vinyl monomer units is not more than any of the upper limits set forth above, flexibility of the particulate polymer increases, and thus close adherence of a functional layer and a substrate can be increased.

[Other Monomer Units]

The particulate polymer may include other monomer units besides a (meth)acrylic acid ester monomer unit and an aromatic vinyl monomer unit. Examples of such other monomer units include, but are not specifically limited to, an acid group-containing monomer unit, a cross-linkable monomer unit, and a nitrile group monomer unit such as subsequently described in the "Binder" section.

The proportional content of other monomer units in the particulate polymer is preferably 10 mass % or less, more preferably 7 mass % or less, and even more preferably 5 mass % or less. When the proportional content of other monomer units is 10 mass % or less, reduction of stability of the composition for a functional layer that is used to form a functional layer can be inhibited.

[Dithioester Structure]

The particulate polymer preferably includes a dithioester structure. When the particulate polymer includes a dithioester structure, process adhesiveness and blocking resistance of an electrochemical device member that includes an obtained functional layer can be further improved. The dithioester structure can more suitably be provided by adding a dithioester compound to the polymerization system as a subsequently described chain transfer agent during production of the particulate polymer. The particulate polymer can include a dithioester structure in a molecule and/or at the end of a molecule.

The term "dithioester structure" refers to a chemical structure that includes a thiocarbonylthio group (—C(═S)—S—). The "dithioester structure" can be introduced by using a compound including a dithioester structure and a free radical leaving group as a chain transfer agent.

The proportional content of the dithioester structure in the particulate polymer is not specifically limited but is preferably 0.004 mass % or less relative to 100 mass % of the particulate polymer.

Note that the proportional content of the dithioester structure in the particulate polymer can be measured using an infrared spectroscopy (IR) method such as FT-IR.

<<Production of Particulate Polymer>>

The particulate polymer can be produced through polymerization of a monomer composition containing the monomers described above, performed in an aqueous solvent such as water, for example. The proportion constituted by each monomer in the monomer composition is normally the same as the proportion constituted by each monomer unit in the particulate polymer.

The polymerization method is not specifically limited and may be suspension polymerization, emulsion polymerization and aggregation, pulverization, dissolution and suspension, or the like. Of these methods, suspension polymerization or emulsion polymerization and aggregation is preferable from a viewpoint of efficiently producing the particulate polymer, and suspension polymerization is more preferable. The polymerization reaction can be radical polymerization, living radical polymerization, or the like, and is preferably living radical polymerization from a viewpoint of controlling the molecular weight distribution of the particulate polymer well using a chain transfer agent.

Accordingly, it is preferable that a chain transfer agent is contained in the polymerization system during production of the particulate polymer. The addition of a chain transfer agent to the polymerization system enables good control of the molecular weight distribution of the obtained particulate polymer.

Although any known chain transfer agent that can be used in production of a conventional particulate polymer can be used without any specific limitations, it is preferable to use a dithioester compound (dithioester derivative) including a thiocarbonylthio group (—C(═S)—S—) in a molecule thereof as a chain transfer agent from a viewpoint of providing the previously described dithioester structure in the obtained particulate polymer. Examples of dithioester compounds that can provide the previously described dithioester structure in the particulate polymer include dithioesters, dithiobenzoates, dithiocarbamates, trithiocarbonates, and xanthates. Specific examples of such dithioester compounds that can be used herein include dithioester compounds represented by the following structural formulae.

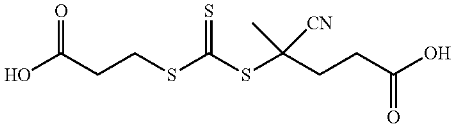

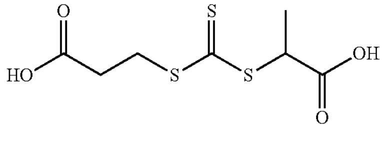

-continued

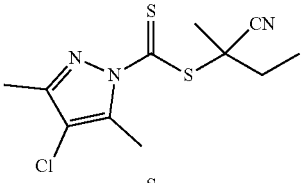

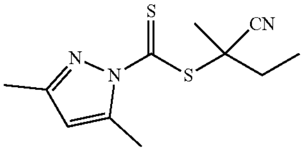

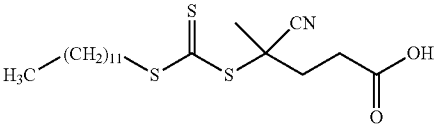

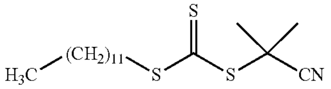

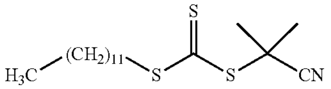

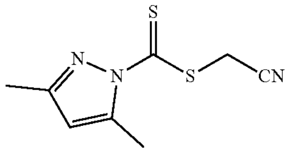

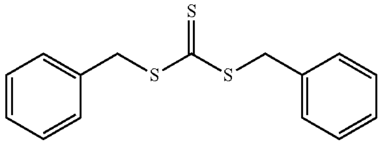

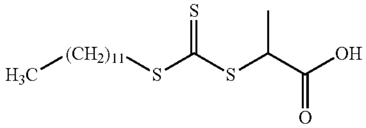

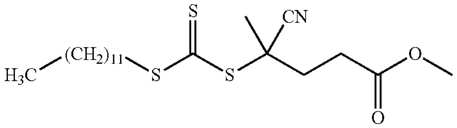

One of these chain transfer agents may be used individually, or two or more of these chain transfer agents may be used in combination in a freely selected ratio.

The used amount of the chain transfer agent is preferably 0.01 parts by mass or more, more preferably 0.1 parts by mass or more, even more preferably 0.5 parts by mass or more, and particularly preferably 1.0 parts by mass or more per 100 parts by mass, in total, of monomers in the monomer composition, and is preferably 10 parts by mass or less, more preferably 5.0 parts by mass or less, even more preferably 3.0 parts by mass or less, and particularly preferably 2.0 parts by mass or less per 100 parts by mass, in total, of monomers in the monomer composition. When the used amount of the chain transfer agent is not less than any of the lower limits set forth above, the molecular weight distribution of the obtained particulate polymer can be controlled well. Moreover, when the used amount of the chain transfer agent is not more than any of the upper limits set forth above, low molecular weight components can be limited to a low proportion in molecule clusters of the obtained particulate polymer, blocking resistance of an electrochemical device member that includes an obtained functional layer can be further improved, and deterioration of electrochemical characteristics of an electrochemical device can be further inhibited.

Although the chain transfer agent may be added into the polymerization system in a single addition or may be split up and added in two or more additions, a single addition is preferable from a viewpoint of further narrowing the molecular weight distribution of the obtained particulate polymer. This is because in a situation in which the chain transfer agent is split up and added, more low molecular weight components are produced, and the molecular weight distribution tends to widen.

[Other Compounding Agents]

Other compounding agents such as polymerization modifiers, polymerization reaction retardants, reactive fluidizers, fillers, flame retardants, antioxidants, and colorants can be compounded in any amount in the monomer composition that is used to produce the particulate polymer.

The following describes, as one example, a method of producing the particulate polymer by suspension polymerization.

[Production of Particulate Polymer by Suspension Polymerization]

(1) Production of Monomer Composition

First, a monomer composition is produced by mixing constituent monomers of the target polymer with a chain transfer agent and/or other compounding agents that are added as necessary.

(2) Formation of Droplets

Next, the monomer composition is dispersed in water, a polymerization initiator is added, and then droplets of the monomer composition are formed. No specific limitations are placed on the method by which the droplets are formed. For example, the droplets can be formed by performing shear stirring of the aqueous medium containing the monomer composition using a disperser such as an emulsifying/dispersing device.

The polymerization initiator that is used may be an oil-soluble polymerization initiator such as t-butyl peroxy-2-ethylhexanoate or azobisisobutyronitrile, for example.

Note that the polymerization initiator may be added at a point after dispersion of the monomer composition in water but before formation of droplets or may be added to the monomer composition before dispersion thereof in water.

From a viewpoint of stabilizing droplets of the monomer composition formed in water, it is preferable that a dispersion stabilizer is added into the water and that droplets of the monomer composition are then formed. The dispersion stabilizer may be sodium dodecylbenzenesulfonate, a metal hydroxide such as magnesium hydroxide, or the like, for example.

(3) Polymerization

After droplets of the monomer composition are formed, the water containing the formed droplets is heated so as to initiate polymerization and thereby form a particulate polymer in the water. The reaction temperature in this polymerization is preferably not lower than 50° C. and not higher than 95° C. Moreover, the reaction time in the polymerization is preferably not less than 1 hour and not more than 10 hours, and is preferably 8 hours or less, and more preferably 6 hours or less.

Note that in a case in which the chain transfer agent is split up and added, the second and any subsequent additions are performed during the polymerization reaction (during heat treatment).

(4) Washing, Filtration, Dehydration, and Drying Steps

Once the polymerization has ended, the particulate polymer can be obtained by performing washing, filtration, and drying of the water containing the particulate polymer by standard methods.

<Binder>

The binder that is contained in the composition for a functional layer is used in order to inhibit detachment of components such as the particulate polymer from a functional layer.

<<Chemical Composition of Binder>>

The chemical composition of the binder is not specifically limited. For example, the binder may be a known polymer that is water-insoluble and can be dispersed in a dispersion medium such as water, is preferably a conjugated diene polymer or an acrylic polymer, and is more preferably an acrylic polymer. The term "acrylic polymer" refers to a polymer that includes a (meth)acrylic acid ester monomer unit.

Note that when a polymer is referred to as "water-insoluble" in the present disclosure, this means that when 0.5 g of the polymer is dissolved in 100 g of water at a temperature of 25° C., insoluble content is 90 mass % or more.

The term "conjugated diene polymer" refers to a polymer that includes a conjugated diene monomer unit. Specific examples of conjugated diene polymers include, but are not specifically limited to, a copolymer including an aromatic vinyl monomer unit and an aliphatic conjugated diene monomer unit such as a styrene-butadiene copolymer (SBR); butadiene rubber (BR); acrylic rubber (NBR) (copolymer including an acrylonitrile unit and a butadiene unit); and hydrogenated products thereof.

Note that one of these binders may be used individually, or two or more of these binders may be used in combination in a freely selected ratio.

An acrylic polymer that can preferably be used as the binder may, for example, be a polymer that includes an acid group-containing monomer unit, a nitrile group-containing monomer unit, and a cross-linkable monomer unit described below in addition to the aforementioned (meth)acrylic acid ester monomer unit, but is not specifically limited thereto.

[Acid Group-Containing Monomer Unit]

Examples of acid group-containing monomers that can form an acid group-containing monomer unit include carboxy group-containing monomers, sulfo group-containing monomers, phosphate group-containing monomers, and hydroxy group-containing monomers.

Moreover, examples of carboxy group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methyl propane sulfonic acid, and 3-allyloxy-2-hydroxypropane sulfonic acid.

In the present specification, "(meth)allyl" is used to indicate "allyl" and/or "methallyl", and "(meth)acryl" is used to indicate "acryl" and/or "methacryl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present specification, "(meth)acryloyl" is used to indicate "acryloyl" and/or "methacryloyl".

Examples of hydroxy group-containing monomers include 2-hydroxyethyl acrylate, 2-hydroxypropyl acrylate, 2-hydroxyethyl methacrylate, and 2-hydroxypropyl methacrylate.

Note that one of these acid group-containing monomers may be used individually, or two or more of these acid group-containing monomers may be used in combination in a freely selected ratio.

[Nitrile Group-Containing Monomer Unit]

Examples of nitrile group-containing monomers that can form a nitrile group-containing monomer unit include α,β-ethylenically unsaturated nitrile monomers. Specifically, any α,β-ethylenically unsaturated compound that includes a nitrile group may be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile.

Note that one of these nitrile group-containing monomers may be used individually, or two or more of these nitrile group-containing monomers may be used in combination in a freely selected ratio.

[Cross-Linkable Monomer Unit]

A cross-linkable monomer unit is a monomer unit that can form a cross-linked structure during or after polymerization by heating or by irradiation with energy rays.

Examples of monomers that can form a cross-linkable monomer unit include polyfunctional monomers including two or more groups that display polymerization reactivity in the monomer. Examples of such polyfunctional monomers include divinyl compounds such as allyl methacrylate and divinylbenzene; di(meth)acrylic acid ester compounds such as diethylene glycol dimethacrylate, ethylene glycol dimethacrylate, diethylene glycol diacrylate, and 1,3-butylene glycol diacrylate; tri(meth)acrylic acid ester compounds such as trimethylolpropane trimethacrylate and trimethylolpropane triacrylate; and epoxy group-containing ethylenically unsaturated monomers such as allyl glycidyl ether and glycidyl methacrylate. Of these polyfunctional monomers, allyl methacrylate, ethylene glycol dimethacrylate, and allyl glycidyl ether are preferable.

Note that one of these cross-linkable monomers may be used individually, or two or more of these cross-linkable monomers may be used in combination in a freely selected ratio.

[Proportional Contents of Monomer Units]

The proportional content of (meth)acrylic acid ester monomer units in the acrylic polymer when all repeating units in the acrylic polymer are taken to be 100 mass % is preferably 50 mass % or more, more preferably 55 mass % or more, and even more preferably 58 mass % or more, and is preferably 98 mass % or less, more preferably 97 mass % or less, and even more preferably 96 mass % or less. Through the proportion constituted by (meth)acrylic acid ester monomer units being not less than the lower limit of any of the ranges set forth above, process adhesiveness and wet adhesiveness of a functional layer can be further increased. Moreover, through the proportion constituted by (meth)acrylic acid ester monomer units being not more than any of the upper limits, electrochemical characteristics of an electrochemical device that includes a functional layer can be further enhanced.

The proportional content of acid group-containing monomer units in the acrylic polymer when all repeating units in the acrylic polymer are taken to be 100 mass % is preferably 0.1 mass % or more, more preferably 0.3 mass % or more, and even more preferably 0.5 mass % or more, and is preferably 20 mass % or less, more preferably 10 mass % or less, and even more preferably 5 mass % or less. Through the proportion constituted by acid group-containing monomer units being not less than any of the lower limits set forth above, dispersibility of the binder in a functional layer can be increased, and electrochemical characteristics of an electrochemical device that includes the functional layer can be sufficiently enhanced. Moreover, through the proportion constituted by acid group-containing monomer units being not more than any of the upper limits set forth above, the residual water content in a functional layer can be reduced, and electrochemical characteristics of an electrochemical device can be sufficiently enhanced.

The proportional content of nitrile group-containing monomer units in the acrylic polymer when all repeating units in the acrylic polymer are taken to be 100 mass % is preferably 1 mass % or more, and more preferably 2 mass % or more, and is preferably 30 mass % or less, and more preferably 20 mass % or less. When the proportional content of nitrile group-containing monomer units is not less than any of the lower limits set forth above, binding strength of the acrylic polymer can be improved, and process adhesiveness and wet adhesiveness of a functional layer can be further increased. On the other hand, when the proportional content of nitrile group-containing monomer units is not more than any of the upper limits set forth above, flexibility of the acrylic polymer can be increased.

The proportional content of cross-linkable monomer units in the acrylic polymer when the amount of all monomer units in the acrylic polymer is taken to be 100 mass % is preferably 0.1 mass % or more, and more preferably 1.0 mass % or more, and is preferably 3.0 mass % or less, and more preferably 2.5 mass % or less. Through the proportion constituted by cross-linkable monomer units being not less than any of the lower limits set forth above, electrochemical characteristics of an electrochemical device that includes a functional layer can be further enhanced. Moreover, through the proportion constituted by cross-linkable monomer units being not more than any of the upper limits set forth above, process adhesiveness and wet adhesiveness of a functional layer can be even further increased.

[Other Monomer Units]

The acrylic polymer may further include other monomer units. Examples of other monomers that can form other monomer units that can be included in the acrylic polymer include aliphatic conjugated diene monomers such as 1,3-butadiene, 2-methyl-1,3-butadiene, 2,3-dimethyl-1,3-butadiene, and 2-chloro-1,3-butadiene; aromatic vinyl monomers such as described in the "Chemical composition of particulate polymer" section; olefin monomers such as ethylene and propylene; halogen atom-containing monomers such as vinyl chloride and vinylidene chloride; vinyl ester monomers such as vinyl acetate, vinyl propionate, vinyl butyrate, and vinyl benzoate; vinyl ether monomers such as methyl vinyl ether, ethyl vinyl ether, and butyl vinyl ether; vinyl ketone monomers such as methyl vinyl ketone, ethyl vinyl ketone, butyl vinyl ketone, hexyl vinyl ketone, and isopropenyl vinyl ketone; and heterocycle-containing vinyl compounds such as N-vinylpyrrolidone, vinylpyridine, and vinylimidazole.

Note that one of these other monomers may be used individually, or two or more of these other monomers may be used in combination in a freely selected ratio. The proportional content of other monomer units in the acrylic polymer may be adjusted as appropriate.

<<Structure of Binder>>

The structure of the binder in the composition for a functional layer may be the same as the structure of the binder in a functional layer or may be a different structure. For example, the binder may have a particulate structure or a non-particulate structure in the composition for a functional layer. Note that the binder normally has a non-particulate structure in a functional layer but is not specifically limited to having a non-particulate structure.

<<Volume-Average Particle Diameter of Binder>>

In a case in which the binder is present as particles in the composition for a functional layer, the volume-average particle diameter of the binder is preferably 0.05 μm or more, more preferably 0.1 μm or more, and even more preferably 0.15 μm or more, and is preferably 0.5 μm or less, more preferably 0.4 μm or less, and even more preferably 0.3 μm or less. When the volume-average particle diameter of the binder is not less than any of the lower limits set forth above, dispersibility of the binder in a functional layer can be increased. Moreover, when the volume-average particle diameter is not more than any of the upper limits set forth above, this enables better binding of the particulate polymer in a functional layer.

Note that the volume-average particle diameter of a binder referred to in the present disclosure can be measured by a method described in the EXAMPLES section.

<<Glass-Transition Temperature of Binder>>

The glass-transition temperature (Tg) of the binder is preferably −100° C. or higher, more preferably −90° C. or higher, and even more preferably −80° C. or higher, and is preferably lower than the glass-transition temperature of the particulate polymer, more preferably 30° C. or lower, even more preferably 20° C. or lower, and particularly preferably 15° C. or lower. When the glass-transition temperature of the binder is not lower than any of the lower limits set forth above, adhesiveness and strength of the binder can be increased. When the glass-transition temperature of the binder is 30° C. or lower, the particulate polymer can be fixed to a substrate without heating, thereby enabling good formation of a functional layer on the substrate.

Note that the glass-transition temperature of a binder referred to in the present disclosure can be measured by a method described in the EXAMPLES section.

<<Content of Binder>>

The content of the binder in the composition for a functional layer is preferably 0.1 parts by mass or more, more preferably 0.2 parts by mass or more, and even more preferably 0.5 parts by mass or more per 100 parts by mass of the particulate polymer, and is preferably 20 parts by mass or less, more preferably 15 parts by mass or less, and even more preferably 10 parts by mass or less per 100 parts by mass of the particulate polymer. When the content of the binder is not less than any of the lower limits set forth above, detachment of the particulate polymer from a functional layer can be sufficiently prevented while also sufficiently increasing process adhesiveness and wet adhesiveness of the functional layer. On the other hand, when the content of the binder is not more than any of the upper limits set forth above, reduction of ion conductivity of a functional layer can be inhibited, and deterioration of electrochemical characteristics of an electrochemical device can be inhibited.

The binder can be produced, for example, through polymerization of a monomer composition containing the monomers described above, performed in an aqueous solvent such as water, for example, but is not specifically limited to being produced in this manner. The proportion constituted by each monomer in the monomer composition is normally the same as the proportion constituted by each monomer unit in the binder.

The polymerization method and the polymerization reaction are not specifically limited and can, for example, be any of the polymerization methods and polymerization reactions given as examples for the polymerization method of the previously described particulate polymer.

<Other Components>

The presently disclosed composition for a functional layer may further contain other components besides the particulate polymer and the binder described above. Examples of such other components include a dispersion medium, non-conductive heat-resistant particles, a water-soluble polymer, and other additives.

<<Dispersion Medium>>

A dispersion medium that can optionally be contained in the presently disclosed composition for a functional layer can cause the composition for a functional layer to have a slurry form (hereinafter, a composition for a functional layer having a slurry form is also referred to as a "slurry composition for a functional layer"). The dispersion medium is volatilized in a situation in which the slurry composition for a functional layer is used in formation of a functional layer that includes a step of drying. This results in a functional layer that is formed of solid content (i.e., a dried product) of the slurry composition for a functional layer.

The dispersion medium can be any medium that can be volatilized in formation of a functional layer, that has a low tendency to cause dissolution of components such as the particulate polymer, and that can maintain a dispersed state of components such as the particulate polymer. The dispersion medium is preferably an aqueous medium. The aqueous medium is water or a mixture of water and a medium other than water. By adopting an aqueous medium as the dispersion medium, it is possible to reduce environmental impact and facilitate handling of the slurry composition for a functional layer.

Examples of mediums that can be combined with water in the aqueous medium include alicyclic hydrocarbon compounds such as cyclopentane and cyclohexane; aromatic hydrocarbon compounds such as toluene and xylene; ketone compounds such as ethyl methyl ketone and cyclohexanone; ester compounds such as ethyl acetate, butyl acetate, γ-butyrolactone, and ε-caprolactone; nitrile compounds such as acetonitrile and propionitrile; ether compounds such as tetrahydrofuran and ethylene glycol diethyl ether; alcohol compounds such as methanol, ethanol, isopropanol, ethylene glycol, and ethylene glycol monomethyl ether; and amide compounds such as N-methylpyrrolidone (NMP) and N,N-dimethylformamide. One of these mediums may be used individually, or two or more of these mediums may be used in combination in a freely selected ratio. The amount of a medium other than water is preferably 5 parts by mass or less relative to 100 parts by mass of water.

The amount of the dispersion medium in the slurry composition for a functional layer is preferably set such that the solid content concentration of the slurry composition for a functional layer is within a desired range. More specifically, the solid content concentration of the slurry composition for a functional layer is preferably 10 weight % or more, more preferably 15 weight % or more, and even more preferably 20 weight % or more, and is preferably 80 weight % or less, more preferably 75 weight % or less, even more preferably 70 weight % or less, and particularly preferably 65 weight % or less. Through the solid content concentration being within any of the ranges set forth above, the slurry composition for a functional layer can be provided with properties suitable for steps of application and drying.

<<Non-Conductive Heat-Resistant Particles>>

Non-conductive heat-resistant particles that can optionally be contained in the presently disclosed composition for a functional layer are a material that can impart heat resistance to an obtained functional layer. When the composition for a functional layer contains non-conductive heat-resistant particles, this is preferable because an obtained functional layer can have both adhesiveness through the particulate polymer and heat resistance through the non-conductive heat-resistant particles. Inorganic particles and/or organic particles can be used as the non-conductive heat-resistant particles. In particular, it is preferable that the non-conductive heat-resistant particles include inorganic particles. When the composition for a functional layer contains inorganic particles, heat resistance of an obtained functional layer can be further increased.

The material of the inorganic particles is preferably an electrochemically stable material that is stably present in the environment of use of an electrochemical device. Examples of materials that are preferable for the inorganic particles from such viewpoints include particles of oxides such as aluminum oxide (alumina), hydrous aluminum oxide (boehmite (AlOOH)), gibbsite ($Al(OH)_3$), silicon oxide, magnesium hydroxide (magnesia), magnesium hydroxide, calcium oxide, titanium oxide (titania), barium titanate ($BaTiO_3$), ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc, montmorillonite, kaolin, and calcined kaolin. Of these examples, the inorganic particles preferably contain at least one selected from the group consisting of alumina, boehmite, barium sulfate, and magnesium hydroxide, and more preferably contain alumina. These inorganic particles may be subjected to element substitution, surface treatment, solid solution treatment, and/or the like as necessary.

Note that one of these types of inorganic particles may be used individually, or two or more of these types of inorganic particles may be used in combination in a freely selected ratio.

The material of the organic particles is preferably an electrochemically stable material that is stably present in the environment of use of an electrochemical device. Examples of materials that are preferable for the organic particles from such viewpoints include materials including polyfunctional ethylenically unsaturated monomer units. Examples of polyfunctional ethylenically unsaturated monomers that can form a polyfunctional ethylenically unsaturated monomer unit include monomers that include two or more ethylenically unsaturated bonds per molecule (excluding conjugated diene monomers such as 1,3-butadiene).

The polyfunctional ethylenically unsaturated monomer may be a polyfunctional (meth)acrylic acid ester monomer such as allyl (meth)acrylate, ethylene glycol di(meth)acrylate, diethylene glycol di(meth)acrylate, triethylene glycol di(meth)acrylate, tetraethylene glycol di(meth)acrylate, or trimethylolpropane tri(meth)acrylate;

a polyfunctional aromatic vinyl monomer such as divinylbenzene or diisopropenylbenzene;

dipropylene glycol diallyl ether, polyglycol diallyl ether, triethylene glycol divinyl ether, hydroquinone diallyl ether, tetraallyloxyethane, trimethylolpropane diallyl ether, an allyl or vinyl ether of a polyfunctional alcohol other than previously listed, triallylamine, methylenebisacrylamide, or the like. Of these polyfunctional ethylenically unsaturated monomers, polyfunctional (meth)acrylic acid ester monomers and polyfunctional aromatic vinyl monomers are preferable from a viewpoint of further improving heat shrinkage resistance of a functional layer, polyfunctional (meth)acrylic acid ester monomers are more preferable, and ethylene glycol dimethacrylate and trimethylolpropane trimethacrylate are even more preferable.

The proportional content of polyfunctional monomer units in the organic particles when all repeating units of a polymer forming the organic particles are taken to be 100 mass % is preferably 50 mass % or more, more preferably 65 mass % or more, and even more preferably 70 mass % or more, and is preferably 90 mass % or less, more preferably 85 mass % or less, and even more preferably 83 mass % or less.

Note that one of these types of organic particles may be used individually, or two or more of these types of organic particles may be used in combination in a freely selected ratio. Moreover, organic particles and inorganic particles may be used in combination in a freely selected ratio.

From a viewpoint of imparting heat resistance, the glass-transition temperature (Tg) of the organic particles is preferably higher than 200° C. Note that the glass-transition temperature of organic particles can be measured by differential scanning calorimetry (DSC), as described in the EXAMPLES section, in the same manner as for the glass-transition temperatures of the particulate polymer and binder described above.

[Volume-Average Particle Diameter of Non-Conductive Heat-Resistant Particles]

The volume-average particle diameter (D50) of the non-conductive heat-resistant particles is preferably 0.1 μm or more, more preferably 0.2 μm or more, and even more preferably 0.3 μm or more, and is preferably 1 μm or less, more preferably 0.9 μm or less, and even more preferably 0.8 μm or less. When the volume-average particle diameter of the non-conductive heat-resistant particles is not less than any of the lower limits set forth above, it is possible to achieve a good balance of dense packing of the non-conductive heat-resistant particles in a functional layer and improvement of output characteristics of an obtained electrochemical device. Moreover, when the volume-average particle diameter of the non-conductive heat-resistant particles is not more than any of the upper limits set forth above, a functional layer can be caused to display excellent heat resistance even when the thickness of a subsequently described non-conductive heat-resistant particle layer is reduced, which makes it possible to increase the capacity of an electrochemical device.

Note that the volume-average particle diameter (D50) of non-conductive heat-resistant particles can be measured by a method described in the EXAMPLES section of the present specification.

[Volume Ratio of Non-Conductive Heat-Resistant Particles and Particulate Polymer]

A volume ratio of the non-conductive heat-resistant particles and the particulate polymer (non-conductive heat-resistant particles/particulate polymer) in the composition for a functional layer is preferably 55/45 or more, more preferably 60/40 or more, and even more preferably 65/35 or more, and is preferably 95/5 or less, more preferably 80/20 or less, even more preferably 75/25 or less, and particularly preferably 70/30 or less. When the volume ratio of the non-conductive heat-resistant particles and the particulate polymer in the composition for a functional layer is not less than any of the lower limits set forth above, heat resistance of a produced functional layer can be improved. On the other hand, when the volume ratio of the non-conductive heat-resistant particles and the particulate polymer in the composition for a functional layer is not more than any of the upper limits set forth above, process adhesiveness of a produced functional layer can be further increased.

[Mass Ratio of Non-Conductive Heat-Resistant Particles and Particulate Polymer]

A mass ratio of the non-conductive heat-resistant particles and the particulate polymer (non-conductive heat-resistant particles/particulate polymer) in the composition for a functional layer is preferably 49/51 or more, more preferably 58/42 or more, and even more preferably 64/36 or more, and is preferably 99/1 or less, more preferably 94/6 or less, and even more preferably 91/9 or less. When the mass ratio of the non-conductive heat-resistant particles and the particulate polymer in the composition for a functional layer is not less than any of the lower limits set forth above, heat resistance of a produced functional layer can be improved. On the other hand, when the mass ratio of the non-conductive heat-resistant particles and the particulate polymer in the composition for a functional layer is not more than any of the upper limits set forth above, process adhesiveness of a produced functional layer can be further increased.

<<Water-Soluble Polymer>>

A water-soluble polymer that can optionally be contained in the presently disclosed composition for a functional layer is a polymer that is water-soluble and that is used in order to cause good dispersion of components such as the particulate polymer and the binder in a functional layer. When the composition for a functional layer contains the water-soluble polymer, components such as the particulate polymer and the binder can be dispersed well in an obtained functional layer, which makes it possible to cause the functional layer to display even better process adhesiveness.

Note that when a polymer is referred to as "water-soluble" in the present disclosure, this means that when 0.5 g of the polymer is dissolved in 100 g of water at a temperature of 25° C., insoluble content is less than 1.0 mass %.

Polyacrylic acid is preferably used as the water-soluble polymer that can be contained in the composition for a functional layer from a viewpoint of causing even better dispersion of the particulate polymer and the binder in a functional layer.

The content of the water-soluble polymer in the composition for a functional layer is preferably 0.1 parts by mass or more, more preferably 0.2 parts by mass or more, and even more preferably 0.3 parts by mass or more per 100 parts by mass of the particulate polymer, and is preferably 1 part by mass or less, more preferably 0.9 parts by mass or less, and even more preferably 0.8 parts by mass or less per 100 parts by mass of the particulate polymer. When the content of the water-soluble polymer is not less than any of the lower limits set forth above, the particulate polymer and the binder can be even better dispersed in a functional layer, which makes it possible to further increase process adhesiveness of an electrochemical device member that includes the functional layer. On the other hand, when the content of the water-soluble polymer is not more than any of the upper limits set forth above, reduction of ion conductivity of a functional layer can be inhibited, and deterioration of electrochemical characteristics of an electrochemical device can be inhibited.

<<Other Additives>>

Examples of other additives that can optionally be contained in the composition for a functional layer include thickeners, dispersants, and the like. For example, carboxymethyl cellulose or the like can be used as a thickener. Moreover, sodium dodecylbenzenesulfonate or the like, for example, can be used as a dispersant.

The additive amount of these additives in the composition for a functional layer can be set as appropriate within a range that yields the desired effects.

<Production of Composition for Functional Layer>

Although no specific limitations are placed on the method by which the presently disclosed composition for a functional layer is produced, the particulate polymer, the binder, water as a dispersion medium, and optional components (non-conductive heat-resistant particles, water-soluble polymer, and/or other additives) that are used as necessary are normally mixed to produce a slurry composition for a functional layer. Although the mixing can be carried out by any method, the mixing is normally carried out using a disperser as a mixer to efficiently disperse the components.

The disperser is preferably a device that enables homogeneous dispersion and mixing of the components. Examples of such devices include a ball mill, a sand mill, a pigment disperser, a grinding machine, an ultrasonic disperser, a homogenizer, and a planetary mixer. A high-level disperser such as a bead mill, a roll mill, or a FILMIX may also be used from a viewpoint that a high level of dispersing shear can be applied.

(Laminate for Electrochemical Device)

A functional layer for an electrochemical device (hereinafter, also referred to simply as a "functional layer") may be obtained by forming the functional layer on a suitable substrate using the composition for a functional layer set forth above. The presently disclosed laminate for an electrochemical device (hereinafter, also referred to simply as a "laminate") is obtained by forming a functional layer on a substrate in this manner. The functional layer that is formed on the substrate can impart excellent process adhesiveness and blocking resistance to an electrochemical device member. The functional layer can also cause an electrochemical device to display excellent electrochemical characteristics (internal resistance characteristics and cycle characteristics).

<Functional Layer for Electrochemical Device>

The functional layer for an electrochemical device contains a particulate polymer and a binder and may optionally contain non-conductive heat-resistant particles, a water-soluble polymer, and so forth. Note that the particulate polymer, binder, non-conductive heat-resistant particles, water-soluble polymer, and so forth mentioned above can be those that were previously described in the "Composition for electrochemical device functional layer" section.

The particulate polymer contained in the functional layer is not specifically limited so long as it has a particulate form. Moreover, the particulate polymer may have a particulate form or any other form after members are adhered to each other via the functional layer.

The thickness of the functional layer is preferably 0.01 μm or more, more preferably 0.1 μm or more, and even more preferably 0.5 μm or more, and is preferably 20 μm or less, more preferably 10 μm or less, and even more preferably 6 μm or less. The strength of the functional layer can be sufficiently ensured through the thickness of the functional layer being not less than the lower limit of any of the ranges set forth above, whereas ion diffusivity of the functional layer can be ensured and low-temperature output characteristics of an electrochemical device can be further improved through the thickness of the functional layer being not more than the upper limit of any of the ranges set forth above.

Although the functional layer may be used as an adhesive layer that does not contain non-conductive heat-resistant particles or may be used as an adhesive layer that does contain non-conductive heat-resistant particles without any specific limitations, the functional layer is preferably used as an adhesive layer that contains non-conductive heat-resistant particles. This is because the inclusion of non-conductive heat-resistant particles makes it possible to impart heat resistance to the functional layer and enables the functional layer to include both an adhesive layer and a heat-resistant layer in a single layer as previously described.

In a case in which the functional layer contains non-conductive heat-resistant particles, a range in which the non-conductive heat-resistant particles are present in the functional layer is referred to as a non-conductive heat-resistant particle layer. In other words, in a case in which, for example, the non-conductive heat-resistant particles are only present in part of the functional layer in a thickness direction thereof (for example, a case in which the particle diameter of the particulate polymer contained in the functional layer is larger than the range in which the non-conductive heat-resistant particles are present), the thickness of the non-conductive heat-resistant particle layer is smaller than the thickness of the functional layer. On the other hand, in a case in which the non-conductive heat-resistant particles are present over the entire thickness of the functional layer, the thickness of the functional layer and the thickness of the non-conductive heat-resistant particle layer are equal to each other.

[Thickness of Non-Conductive Heat-Resistant Particle Layer]

The thickness of the non-conductive heat-resistant particle layer is preferably 0.5 μm or more, more preferably 0.8 μm or more, and even more preferably 1 μm or more, and is preferably 6 μm or less, more preferably 5 μm or less, and even more preferably 4 μm or less. When the thickness of the non-conductive heat-resistant particle layer is not less than any of the lower limits set forth above, heat resistance of the functional layer can be improved. On the other hand, when the thickness of the non-conductive heat-resistant particle layer is not more than any of the upper limits set forth above, reduction of energy density of an electrochemical device that includes the functional layer can be inhibited. Moreover, when the thickness of the non-conductive heat-resistant particle layer is not more than any of the upper limits set forth above, the functional layer can be provided with good process adhesiveness.

The thickness of the non-conductive heat-resistant particle layer can be measured, for example, from an SEM image that is obtained by observing a cross-section of the laminate using a field emission scanning electron microscope (FE-SEM) or the like. The thickness of the non-conductive heat-resistant particle layer is taken to be the distance from the surface of the substrate on which the functional layer is formed to a non-conductive heat-resistant particle that is furthest separated therefrom in a vertical direction.

Note that the thickness of the non-conductive heat-resistant particle layer can be adjusted, for example, through the proportional content of non-conductive heat-resistant particles in the composition for a functional layer used in the subsequently described method of forming the laminate for an electrochemical device, the thickness of a formed coating film, and so forth.

In a case in which the functional layer includes a non-conductive heat-resistant particle layer, the volume-average particle diameter of the particulate polymer contained in the functional layer is preferably larger than the thickness of the non-conductive heat-resistant particle layer. This makes it possible to cause the functional layer to display good process adhesiveness.

Note that in the functional layer, at least a portion of the particulate polymer is normally embedded in the non-conductive heat-resistant particle layer.

The non-conductive heat-resistant particle layer may further contain other components besides the non-conductive heat-resistant particles. Note that such other components are normally contained in the non-conductive heat-resistant particle layer. Examples of other components that can be contained in the non-conductive heat-resistant particle layer include the previously described binder and water-soluble polymer.

<<Volume-Average Particle Diameter of Particulate Polymer>>

The volume-average particle diameter of the particulate polymer in the functional layer is preferably 0.1 μm or more, more preferably 1.0 μm or more, even more preferably 2.5 μm or more, and particularly preferably 5.0 μm or more, and is preferably 10.0 μm or less, more preferably 9.0 μm or less, and even more preferably 8.0 μm or less.

When the volume-average particle diameter of the particulate polymer in the functional layer is not less than any of the lower limits set forth above, the particulate polymer can easily protrude relative to the non-conductive heat-resistant particles at a thickness direction surface of the functional layer, and thus the functional layer can be caused to display even better process adhesiveness. Moreover, this ensures that when a member that includes the functional layer and another member are adhered to each other, a gap is present between the non-conductive heat-resistant particle layer and the other member in a thickness direction of the functional layer. Furthermore, electrolyte solution injectability of an electrochemical device improves because the electrolyte solution is injected via this gap. Also, when the volume-average particle diameter of the particulate polymer in the functional layer is not less than any of the lower limits set forth above, heat resistance of the functional layer improves.

Although it is not clear why heat resistance of the functional layer improves through the volume-average particle diameter of the particulate polymer in the functional layer being not less than any of the lower limits set forth above, the reason for this is presumed to be as follows. Specifically, it is necessary for the proportion constituted by non-conductive heat-resistant particles in the functional layer to be high in order to increase heat resistance. It is thought that as a result of the particulate polymer protruding relative to the non-conductive heat-resistant particles at the thickness direction surface of the functional layer, the proportion constituted by non-conductive heat-resistant particles in the non-conductive heat-resistant particle layer appears to be higher, and thus heat resistance increases.

On the other hand, when the volume-average particle diameter of the particulate polymer in the functional layer is not more than any of the upper limits set forth above, process adhesiveness of the functional layer can be further increased because the number of particles of the particulate polymer increases relative to the volume thereof in the functional layer, and the number of adhesion points when a member that includes the functional layer and another member are adhered increases.

The volume-average particle diameter of the particulate polymer in the functional layer can be adjusted, for example, through the type and amount of a metal hydroxide that is used in production of the particulate polymer used to produce the functional layer.

Note that the volume-average particle diameter of a particulate polymer in a functional layer can be measured by a method described in the EXAMPLES section.

<<Ratio of Volume-Average Particle Diameter of Particulate Polymer and Thickness of Non-Conductive Heat-Resistant Particle Layer>>

A ratio of the volume-average particle diameter of the particulate polymer and the thickness of the non-conductive heat-resistant particle layer (volume-average particle diameter of particulate polymer/thickness of non-conductive heat-resistant particle layer) in the functional layer is preferably 1.1 or more, more preferably 1.2 or more, and even more preferably 1.6 or more, and is preferably 10.0 or less, more preferably 5.0 or less, and even more preferably 3.5 or less.

When the ratio of the volume-average particle diameter of the particulate polymer and the thickness of the non-conductive heat-resistant particle layer in the functional layer is not less than any of the lower limits set forth above, the particulate polymer can easily protrude relative to the non-conductive heat-resistant particles at a thickness direction surface of the functional layer, and thus the functional layer can be caused to display even better process adhesiveness. Moreover, this ensures that when a member that includes the functional layer and another member are adhered to each other, a gap is present between the non-conductive heat-resistant particle layer and the other member in a thickness direction of the functional layer. Furthermore, electrolyte solution injectability of an electrochemical device improves because the electrolyte solution is injected via this gap. Also, when the ratio of the volume-average particle diameter of the particulate polymer and the thickness of the non-conductive heat-resistant particle layer in the functional layer is not less than any of the lower limits set forth above, heat resistance of the functional layer improves.

On the other hand, when the ratio of the volume-average particle diameter of the particulate polymer and the thickness of the non-conductive heat-resistant particle layer in the functional layer is not more than any of the upper limits set forth above, process adhesiveness of the functional layer can be further increased because the number of particles of the particulate polymer increases relative to the volume thereof in the functional layer, and the number of adhesion points when a member that includes the functional layer and another member are adhered increases.

<<Other Additives>>

The functional layer may further contain additives other than the previously described non-conductive heat-resistant particles and water-soluble polymer as other components.

Examples of additives that can optionally be contained in the functional layer include additives that were described in the "Composition for electrochemical device functional layer" section.

The used amount of these additives in the functional layer can be set as appropriate within a range that yields the desired effects.

<Substrate>

No specific limitations are placed on the type of substrate on which the functional layer is formed. For example, a separator substrate can be used as the substrate in a case in which the functional layer is used as a member that constitutes part of a separator, and an electrode substrate obtained by forming an electrode mixed material layer on a current collector can be used as the substrate in a case in which the functional layer is used as a member that constitutes part of an electrode. Moreover, no specific limitations are placed on the use of the laminate that is obtained by forming the functional layer on the substrate using the composition for a functional layer. For example, the functional layer may be formed on a separator substrate or the like and then the resultant laminate may be used in that form as an electrochemical device member such as a separator, the functional layer may be formed on an electrode substrate and then the resultant laminate may be used in that form as an electrode, or the functional layer may be formed on a releasable substrate, may then be peeled from the releasable substrate and affixed to another substrate, and the resultant laminate may be used as an electrochemical device member.

However, from a viewpoint of omitting a step of peeling the functional layer from a releasable substrate and increasing production efficiency of an electrochemical device member, it is preferable that a separator substrate or an electrode substrate is used as the substrate and that the laminate is used in that form as an electrochemical device member. The functional layer formed on the separator substrate or electrode substrate can impart excellent process adhesiveness and blocking resistance to an electrochemical device member and improve electrochemical characteristics of an electrochemical device as a result of containing the previously described particulate polymer and binder.

<<Separator Substrate>>

The separator substrate on which the functional layer may be formed is not specifically limited and can be any of those described in JP2012-204303A, for example. Of these separator substrates, a microporous membrane made of polyolefinic (polyethylene, polypropylene, polybutene, or polyvinyl chloride) resin is preferable because such a membrane can reduce the total thickness of the separator, which increases the ratio of electrode active material in an electrochemical device, and thereby increases the volumetric capacity.

<<Electrode Substrate>>

The electrode substrate (positive electrode substrate or negative electrode substrate) on which the functional layer may be formed is not specifically limited and may be an electrode substrate obtained by forming an electrode mixed material layer on a current collector.

The current collector, components in the electrode mixed material layer (for example, an electrode active material (positive electrode active material or negative electrode active material) and a binder for an electrode mixed material layer (binder for a positive electrode mixed material layer or binder for a negative electrode mixed material layer)), and the method by which the electrode mixed material layer is formed on the current collector can be known examples thereof. Specifically, any of those described in JP2013-145763A, for example, can be used.

[Releasable Substrate]

The releasable substrate on which the functional layer may be formed is not specifically limited and can be a known releasable substrate.

<<Other Layers>>

The presently disclosed laminate may, in addition to the functional layer described above, further include one or more other layers that display expected functions on the substrate. For example, the laminate may include a heat-resistant layer containing non-conductive heat-resistant particles and a binder between the substrate and the functional layer. This makes it possible to impart heat resistance to the laminate even in a case in which the functional layer is used as an adhesive layer that does not contain non-conductive heat-resistant particles. The non-conductive heat-resistant particles and binder that are used in the heat-resistant layer can be any of the previously described non-conductive heat-resistant particles and binders.

The thickness of the heat-resistant layer is not specifically limited so long as heat resistance can be sufficiently imparted, but is preferably 0.1 μm or more, and more preferably 0.2 μm or more, and is preferably 20 μm or less, and more preferably 15 μm or less. Through the thickness of the heat-resistant layer being within any of the ranges set forth above, reduction of ion conductivity can be inhibited while also providing sufficient binding capacity in the heat-resistant layer.

No specific limitations are placed on the method by which the heat-resistant layer is produced. For example, the heat-resistant layer can be formed by applying a slurry for a heat-resistant layer that contains non-conductive heat-resistant particles, a binder, and a dispersion medium such as water onto the substrate, and then drying the coating film that is obtained. Alternatively, the heat-resistant layer may be formed on a releasable substrate such as previously described, and may then be peeled from the releasable substrate and affixed to the substrate.

Note that other layers such as a heat-resistant layer may be provided at one side of the substrate or at both sides of the substrate.

<<Formation Method of Laminate for Electrochemical Device>>

The laminate for an electrochemical device can be formed by forming the functional layer on an electrode substrate or a separator substrate by any of the following methods, for example.

(1) A method in which the composition for a functional layer is applied onto the surface of a separator substrate or an electrode substrate (surface at the electrode mixed material layer-side in the case of an electrode substrate; same applies below) and is then dried (2) A method in which a separator substrate or an electrode substrate is immersed in the composition for a functional layer and is then dried (3) A method in which the composition for a functional layer is applied onto a releasable substrate and is dried to produce a functional layer that is then transferred onto the surface of a separator substrate or an electrode substrate Of these methods, method (1) is particularly preferable because it is easy to control the thickness of the functional layer. In more detail, method (1) includes a step of applying the composition for a functional layer onto a separator substrate or an electrode substrate (application step) and a step of drying the composition for a functional layer that has been applied onto the separator substrate or the electrode substrate so as to form a functional layer (drying step). Note that a functional layer may be formed on just one side of the substrate, or functional layers may be formed on both sides of the substrate.

No specific limitations are placed on the method by which the composition for a functional layer is applied onto the separator substrate or the electrode substrate in the application step. For example, a method such as spray coating, doctor blading, reverse roll coating, direct roll coating, gravure coating, extrusion coating, or brush coating may be used. Of these methods, gravure coating and spray coating are preferable in terms of forming a thinner functional layer.

The composition for a functional layer on the substrate may be dried by any commonly known method in the drying step without any specific limitations. Examples of drying methods that may be used include drying by warm, hot, or low-humidity air; drying in a vacuum; or drying through irradiation with infrared light, electron beams, or the like. Although no specific limitations are placed on the drying conditions, the drying temperature is preferably 30° C. to 80° C., and the drying time is preferably 30 seconds to 10 minutes.

<Electrochemical Device>

A feature of the presently disclosed electrochemical device is that it includes the presently disclosed laminate for an electrochemical device set forth above. The presently disclosed electrochemical device can display excellent electrochemical characteristics as a result of including the presently disclosed laminate for an electrochemical device set forth above.

The presently disclosed electrochemical device may be, but is not specifically limited to, a lithium ion secondary battery or an electric double-layer capacitor, for example, and is preferably a lithium ion secondary battery.

The following describes a lithium ion secondary battery as one example of the presently disclosed electrochemical device. A lithium ion secondary battery according to the present disclosure includes the presently disclosed laminate for an electrochemical device set forth above. More specifically, the lithium ion secondary battery includes a positive electrode, a negative electrode, a separator, and an electrolyte solution, and at least one of the positive electrode, the negative electrode, and the separator is formed of the presently disclosed laminate for an electrochemical device set forth above. In the lithium ion battery according to the present disclosure, the positive electrode and the separator and/or the negative electrode and the separator are strongly adhered in the electrolyte solution through a functional layer. Consequently, the lithium ion secondary battery has excellent battery characteristics such as internal resistance characteristics and cycle characteristics.

Note that any known positive electrode, negative electrode, or electrolyte solution that is used in a lithium ion secondary battery can be used for the aforementioned positive electrode, negative electrode, and electrolyte solution.

<Positive Electrode and Negative Electrode>

The electrodes (positive electrode and negative electrode) may, more specifically, each be an electrode that is obtained by forming an electrode mixed material layer on a current collector. The current collector may be made of a metal material such as iron, copper, aluminum, nickel, stainless steel, titanium, tantalum, gold, or platinum. Of these metal materials, the current collector for the negative electrode is preferably made of copper. The current collector for the positive electrode is preferably made of aluminum. The electrode mixed material layer can be a layer that contains an electrode active material and a binder.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that may be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used in a lithium ion secondary battery, for example, include carbonates such as dimethyl carbonate (DMC), ethylene carbonate (EC), diethyl carbonate (DEC), propylene carbonate (PC), butylene carbonate (BC), methyl ethyl carbonate (ethyl methyl carbonate (EMC)), and vinylene carbonate; esters such as γ-butyrolactone and methyl formate; ethers such as 1,2-dimethoxyethane and tetrahydrofuran; and sulfur-containing compounds such as sulfolane and dimethyl sulfoxide.

Furthermore, a mixture of such solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Electrochemical Device>

The presently disclosed electrochemical device can be produced using the presently disclosed laminate for an electrochemical device set forth above.

Specifically, in a case in which a lithium ion secondary battery is to be produced, for example, the lithium ion secondary battery can be produced by stacking the positive electrode and the negative electrode with the separator in-between, performing rolling, folding, or the like of the resultant laminate, as necessary, to place the laminate in a battery container, injecting the electrolyte solution into the battery container, and sealing the battery container. At least one of the positive electrode, the negative electrode, and the separator is produced using the presently disclosed laminate for an electrochemical device set forth above. In order to prevent pressure increase inside the battery and occurrence of overcharging or overdischarging, an expanded metal; an overcurrent preventing device such as a fuse or a PTC device; or a lead plate may be placed in the battery container as necessary. The shape of the battery may, for example, be a coin type, a button type, a sheet type, a cylinder type, a prismatic type, or a flat type.

EXAMPLES

The following provides a more specific description of the present disclosure based on examples. However, the present disclosure is not limited to these examples.

Various measurements and evaluations in the examples and comparative examples were performed by the following methods.

Moreover, in the case of a polymer that is produced through copolymerization of a plurality of types of monomers, the proportion constituted in the polymer by a structural unit formed through polymerization of a given monomer is normally, unless otherwise specified, the same as the ratio (charging ratio) of the given monomer among all monomers used in polymerization for forming the polymer.

In the examples and comparative examples, measurements of weight-average molecular weight (Mw), number-average molecular weight (Mn), glass-transition temperature, volume-average particle diameter, volume ratio of non-conductive heat-resistant particles and a particulate polymer, and thickness of a non-conductive heat-resistant particle layer were performed by the following methods. Moreover, in the examples and comparative examples, evaluations of process adhesiveness, wet adhesiveness, and blocking resistance of a functional layer (battery member), and internal resistance characteristics and cycle characteristics of a secondary battery were performed by the following methods.

<Weight-Average Molecular Weight (Mw), Number-Average Molecular Weight (Mn), and Molecular Weight Distribution (Mw/Mn) of Particulate Polymer>

A portion of a particulate polymer produced in each example or comparative example was sampled, the weight-average molecular weight (Mw) and number-average molecular weight (Mn) thereof were measured by gel permeation chromatography (GPC), and the molecular weight distribution (Mw/Mn) was calculated.

Specifically, the particulate polymer was adjusted to a solid content concentration of 0.2% and was then passed through a 0.2 μm filter. The obtained solution was used to measure the weight-average molecular weight (Mw) and the number-average molecular weight (Mn) of the particulate polymer as standard polystyrene-equivalent values in a gel permeation chromatograph (HLC-8220 produced by Tosoh Corporation) in which one "TSK guard column a" and two "TSKgel SuperHZM-M" columns produced by Tosoh Corporation were connected in series and in which tetrahydrofuran was used as a solvent with a flow rate of 1.0 mL/min. The molecular weight distribution (Mw/Mn) was then calculated.

<Glass-Transition Temperature of Particulate Polymer and Binder>

A particulate polymer and a binder produced in each example or comparative example were each used as a measurement sample. The measurement sample was weighed into an aluminum pan in an amount of 10 mg and was then measured by a differential scanning calorimeter (EXSTAR DSC6220 produced by SII NanoTechnology Inc.) under conditions prescribed in JIS Z 8703 with a measurement temperature range of −100° C. to 500° C. and a heating rate of 10° C./min and with an empty aluminum pan as a reference so as to obtain a differential scanning calorimetry (DSC) curve. In the heating process, an intersection point of a baseline directly before a heat absorption peak on the DSC curve at which a derivative signal (DDSC) reached 0.05 mW/min/mg or more and a tangent to the DSC curve at a first inflection point to appear after the heat absorption peak was determined as the glass-transition temperature (° C.).

<Volume-Average Particle Diameter of Particulate Polymer Produced by Suspension Polymerization>

Particulate polymers produced in Examples 1 to 11 and Comparative Example 1 were each taken to be a measurement sample. An amount equivalent to 0.1 g of the measurement sample was weighed and taken into a beaker, and then 0.1 mL of alkylbenzenesulfonic acid aqueous solution (DRIWEL produced by FUJIFILM Corporation) was added as a dispersant. In addition, 10 mL to 30 mL of a diluent (ISOTON II produced by Beckman Coulter, Inc.) was added into the beaker, and 3 minutes of dispersing was performed using a 20 W (watt) ultrasonic disperser. A particle diameter meter (Multisizer produced by Beckman Coulter, Inc.) was subsequently used to determine the volume-average particle diameter of the measurement sample under conditions of an aperture diameter of 20 μm, a medium of ISOTON II, and a measured particle count of 100,000 particles.

<Volume-Average Particle Diameter of Particulate Polymer and Binder Produced by Emulsion Polymerization>

The volume-average particle diameters of particulate polymers produced in Example 12 and Comparative Example 2 and binders produced in Examples 1 to 12 and Comparative Examples 1 and 2 were measured by laser diffraction. Specifically, a produced water dispersion (adjusted to solid content concentration of 0.1 mass %) containing a particulate polymer or particles of a binder was taken to be a sample. In a particle diameter distribution (by volume) measured using a laser diffraction particle size analyzer (produced by Beckman Coulter, Inc.; product name: LS-13 320), the particle diameter D50 at which cumulative volume calculated from the small diameter end of the distribution reached 50% was taken to be the volume-average particle diameter.

<Volume-Average Particle Diameter of Particulate Polymer in Functional Layer>

The surface of a functional layer in a functional layer-equipped separator produced in each example or comparative example was observed using a field emission scanning electron microscope (FE-SEM; JSM-7800 Prime produced by JEOL Ltd.; detector: BED-C; accelerating voltage: 5 kV; magnification: ×5,000 to 10,000) with each individual particle of a particulate polymer enlarged. The number of observed particles of the particulate polymer was 200.

Images of the observed particulate polymer were each binarized, and the area of the particulate polymer in the field of view was determined. Specifically, the binarization (threshold value 38) was performed using image analysis software (WinROOF produced by Mitani Corporation) with emphasis conditions set as "Brightness: −30" and "Contrast: +70", and with a filter set as 7×7 with two threshold values. For each of the 200 SEM images that were obtained, the functional layer surface was observed in plan view, and the area of the particulate polymer was determined. The diameter of the particulate polymer was calculated from the determined area of the particulate polymer by assuming the particulate polymer to be a perfect sphere. Volumes were then calculated from the diameters of the 200 particles of the particulate polymer by assuming the particulate polymer to be a perfect sphere. A total value for the volumes of all of the particles of the particulate polymer was taken to be 100%, the amount of the particulate polymer present in each particle diameter interval was expressed as a percentage, and the particle diameter at which the amount of particulate polymer reached 50% was taken to be the volume-average particle diameter of the particulate polymer in the functional layer.

<Volume-Average Particle Diameter of Non-Conductive Heat-Resistant Particles>

The volume-average particle diameter of non-conductive heat-resistant particles used in each example or comparative example was taken to be the particle diameter (D50) at which, in a particle diameter distribution (by volume) measured by laser diffraction, cumulative volume calculated from a small diameter end of the distribution reached 50%.

<Volume Ratio of Non-Conductive Heat-Resistant Particles and Particulate Polymer>

A volume ratio of non-conductive heat-resistant particles and a particulate polymer (non-conductive heat-resistant particles/particulate polymer) was calculated from charged amounts of the non-conductive heat-resistant particles and the particulate polymer in production of a slurry composition.

<Thickness of Non-Conductive Heat-Resistant Particle Layer>

The thickness of a non-conductive heat-resistant particle layer was calculated from an image obtained by observing a cross-section of a functional layer-equipped separator using a field emission scanning electron microscope (FE-SEM). Note that the thickness of the non-conductive heat-resistant particle layer was taken to be the vertical direction distance from the surface of the separator at a side at which the functional layer was formed to the surface of non-conductive heat-resistant particles forming the surface of the functional layer.

<Process Adhesiveness>

A positive electrode, a negative electrode, and a functional layer-equipped separator produced in each example or comparative example were each cut out as 10 mm in width and 50 mm in length. The positive electrode and the functional layer-equipped separator were then stacked such that the surface at the positive electrode mixed material layer-side of the positive electrode and the separator were facing each other, and were pressed at a pressing rate of 30 m/min by roll pressing with a temperature of 70° C. and a load of 5 kN/m so as to obtain a test specimen.

This test specimen was placed with the surface at the current collector-side of the positive electrode facing downward, and cellophane tape was affixed to the surface of the electrode. Tape prescribed by JIS Z1522 was used as the cellophane tape. The cellophane tape was fixed to a horizontal test stage in advance. Next, one end of the separator substrate was pulled vertically upward at a pulling speed of 50 mm/min to peel off the separator substrate, and the stress during this peeling was measured.

A total of three stress measurements were made for a test specimen of the negative electrode and the functional layer-equipped separator in the same manner as for when the positive electrode was used.

An average value of the total of 6 stresses obtained through measurement using the positive electrode and the negative electrode was calculated as the peel strength P1 (N/m) and was evaluated as process adhesiveness of the electrodes and the functional layer-equipped separator by the following standard. A larger peel strength indicates that a functional layer has better process adhesiveness.

A: Peel strength P1 of 8 N/m or more

B: Peel strength P1 of not less than 5 N/m and less than 8 N/m

C: Peel strength P1 of not less than 3 N/m and less than 5 N/m

D: Peel strength P1 of less than 3 N/m

<Wet Adhesiveness>

A composition for a functional layer obtained in each example or comparative example was applied onto the surface of a separator substrate, and the composition for a functional layer on the separator substrate was dried at 50° C. for 10 minutes to form a functional layer (thickness: 2 μm). This functional layer-equipped separator was used as a separator for evaluation. The functional layer-equipped separator was cut out as a strip shape of 10 mm×100 mm. The separator was placed along the surface (negative electrode mixed material layer-side) of a negative electrode produced in each example or comparative example and was then heat pressed for 6 minutes at a temperature of 85° C. and a pressure of 0.5 MPa to produce a laminate including the negative electrode and the functional layer-equipped separator. This laminate was taken to be a test specimen.

The test specimen was placed in laminate packing with approximately 400 μL of electrolyte solution. After 1 hour, the test specimen was pressed, together with the laminate packing, for 15 minutes at 40° C. with a pressure of 0.5 MPa. The test specimen was held at a temperature of 40° C. for 1 day after the pressing. Note that a solution obtained by dissolving $LiPF_6$ as a supporting electrolyte with a concentration of 1 mol/L in a mixed solvent of EC, DEC, and vinylene carbonate (VC) (EC/DEC/VC (volume mixing ratio at 25° C.)=68.5/30/1.5) was used as the electrolyte solution.

The test specimen was then taken out, and electrolyte solution attached to the surface of the test specimen was wiped off. Next, the test specimen was placed with the surface at the current collector-side of the negative electrode facing downward, and cellophane tape was affixed to the surface at the current collector-side of the negative electrode. Tape prescribed by JIS Z1522 was used as the cellophane tape. The cellophane tape was fixed to a horizontal test stage in advance. Next, one end of the separator substrate was pulled vertically upward at a pulling speed of 50 mm/min to peel off the separator substrate, and the stress during this peeling was measured. Three measurements were made in this manner. An average value of the stress was calculated as the peel strength P2 (N/m) and was evaluated by the following standard. The evaluation results are shown in Table 1. A larger peel strength P2 indicates better adhesiveness of the functional layer after immersion in electrolyte solution (wet adhesiveness) and stronger adhesion of the electrode and the functional layer-equipped separator in electrolyte solution.

A: Peel strength P2 of 5.0 N/m or more
B: Peel strength P2 of not less than 3.0 N/m and less than 5.0 N/m
C: Peel strength P2 of not less than 1.0 N/m and less than 3.0 N/m
D: Peel strength P2 of less than 1.0 N/m <Blocking Resistance>

Two pieces each having a size of 4 cm in width by 4 cm in length were cut out from a functional layer-equipped separator produced in each example or comparative example and were taken to be test specimens. The two obtained test specimens were overlapped and were then pressed for 2 minutes under pressing with a pressure of 5 MPa at a temperature of 20° C. so as to obtain a pressed product. One end of the obtained pressed product was fixed in place, and the other end of the pressed product was pulled vertically upward at a pulling speed of 50 mm/min to cause peeling. The stress during this peeling was measured, and the determined stress was taken to be the blocking strength. The blocking strength was evaluated by the following standard. A smaller blocking strength indicates better inhibition of blocking by the functional layer (i.e., higher blocking resistance).

A: Blocking strength of less than 1 N/m
B: Blocking strength of not less than 1 N/m and less than 3 N/m
C: Blocking strength of not less than 3 N/m and less than 5 N/m
D: Blocking strength of 5 N/m or more <Cycle Characteristics of Secondary Battery>

A lithium ion secondary battery produced in each example or comparative example was left at rest at a temperature of 25° C. for 5 hours. Next, the lithium ion secondary battery was charged to a cell voltage of 3.65 V by a 0.2C constant-current method at a temperature of 25° C., and was then subjected to 12 hours of aging at a temperature of 60° C. The lithium ion secondary battery was subsequently discharged to a cell voltage of 3.00 V by a 0.2C constant-current method at a temperature of 25° C. Thereafter, the lithium ion secondary battery was CC-CV charged by a 0.2C constant-current method (upper limit cell voltage 4.40 V) and was then CC discharged to 3.00 V by a 0.2C constant-current method. This charging and discharging at 0.2C was repeated three times.

Thereafter, the lithium ion secondary battery was subjected to 100 cycles of a charge/discharge operation with a cell voltage of 4.40 V to 3.00 V and a charge/discharge rate of 1.0C in an environment having a temperature of 10° C. The discharge capacity of the $1^{st}$ cycle was defined as X1, and the discharge capacity of the $100^{th}$ cycle was defined as X2.

A capacity maintenance rate ΔC' was calculated using the discharge capacity X1 and the discharge capacity X2 (ΔC'=(X2/X1)×100(%)) and was evaluated by the following standard. A larger value for the capacity maintenance rate ΔC' indicates that the secondary battery has better cycle characteristics.

A: Capacity maintenance rate ΔC' of 90% or more
B: Capacity maintenance rate ΔC' of not less than 85% and less than 90%
C: Capacity maintenance rate ΔC' of not less than 80% and less than 85%

<Internal Resistance Characteristics of Secondary Battery>

A lithium ion secondary battery produced in each example or comparative example was charged to an SOC (State Of Charge) of 50% at 1C (C is a value expressed by rated capacity (mA)/1 h (hour)) at 10° C. Thereafter, 15 seconds of charging and 15 seconds of discharging centered around an SOC of 50% were performed at each of 0.5C, 1.0C, 1.5C, and 2.0C. A plot of the battery voltage after 10 seconds in each of these cases (charging side and discharging side) against the current value was prepared, the gradient of this plot was divided back by the area of the positive electrode of the produced lithium ion secondary battery, and the resultant value was taken to be the IV resistance ($\Omega \cdot cm^2$) (IV resistance during charging and IV resistance during discharging). The obtained IV resistance value ($\Omega \cdot cm^2$) was evaluated by the following standard. A smaller IV resistance value indicates lower internal resistance (lower direct current resistance) and better internal resistance characteristics.

A: IV resistance of 22 $\Omega \cdot cm^2$ or less
B: IV resistance of more than 22 $\Omega \cdot cm^2$ and not more than 25 $\Omega \cdot cm^2$
C: IV resistance of more than 25 $\Omega \cdot cm^2$ and not more than 28 $\Omega \cdot cm^2$
D: IV resistance of more than 28 $\Omega \cdot cm^2$

Example 1

<Production of Particulate Polymer>

[Production of Monomer Composition (A)]

A monomer composition (A) was produced by mixing 70 parts of styrene as an aromatic vinyl monomer and 30 parts of butyl acrylate as a (meth)acrylic acid ester monomer.

[Production of Metal Hydroxide]

An aqueous solution (A2) of 5.6 parts of sodium hydroxide dissolved in 50 parts of deionized water was gradually added under stirring to an aqueous solution (A1) of 8.0 parts of magnesium chloride dissolved in 200 parts of deionized water so as to produce a colloidal dispersion liquid (A) containing magnesium hydroxide as a metal hydroxide.

[Suspension Polymerization]

A particulate polymer was produced by suspension polymerization. Specifically, the monomer composition (A) obtained as described above was added to the colloidal dispersion liquid (A) containing magnesium hydroxide, was further stirred therewith, and then 2.0 parts of t-butyl peroxy-2-ethylhexanoate (PERBUTYL O produced by NOF Corporation) as a polymerization initiator and 2.0 parts of a chain transfer agent (A) (S,S-dibenzyl trithiocarbonate; 043-33983 produced by FUJIFILM Wako Pure Chemical Corporation) were added to obtain a mixture. The obtained mixture was subjected to 1 minute of high-shear stirring at a rotation speed of 15,000 rpm using an inline emulsifying/dispersing device (CAVITRON produced by Pacific Machinery & Engineering Co., Ltd.) so as to form droplets of the monomer composition in the colloidal dispersion liquid (A) containing magnesium hydroxide.

The magnesium hydroxide-containing colloidal dispersion liquid (A) in which droplets of the monomer composition had been formed was loaded into a reactor, was heated to 90° C., and a polymerization reaction was performed for 5 hours to yield a water dispersion containing a particulate polymer.

Sulfuric acid was added dropwise to the water dispersion containing the particulate polymer under stirring at room temperature (25° C.) so as to perform acid washing until the pH reached 6.5 or lower. Next, separation by filtration was performed, 500 parts of deionized water was added to the obtained solid content, a slurry was formed once again, and water washing treatment (washing, filtration, and dehydration) was repeated a number of times. Next, separation by filtration was performed, and then the obtained solid content was loaded into a vessel of a dryer and was dried at 40° C. for 48 hours to yield a dried particulate polymer. The obtained particulate polymer was confirmed to include a dithioester structure as a result of measurement of the particulate polymer by FT-IR.

The weight-average molecular weight, number-average molecular weight, glass-transition temperature, and volume-average particle diameter of the obtained particulate polymer were measured. The results are shown in Table 1.

<Production of Water Dispersion Containing Binder (α)>

A reactor including a stirrer was supplied with 70 parts of deionized water, 0.15 parts of sodium lauryl sulfate (EMAL® 2F (EMAL is a registered trademark in Japan, other countries, or both) produced by Kao Corporation) as an emulsifier, and 0.5 parts of ammonium persulfate as a polymerization initiator, the gas phase was purged with nitrogen gas, and the temperature was raised to 60° C.

Meanwhile, a monomer composition (α) was produced in a separate vessel by mixing 50 parts of deionized water, 0.5 parts of sodium dodecylbenzenesulfonate as a dispersion stabilizer, 94 parts of n-butyl acrylate as a (meth)acrylic acid ester monomer, 2 parts of methacrylic acid as an acid group-containing monomer, 2 parts of acrylonitrile as a nitrile group-containing monomer, and 1 part of allyl methacrylate and 1 part of allyl glycidyl ether as cross-linkable monomers.

The obtained monomer composition (α) was continuously added into the above-described reactor including a stirrer over 4 hours to perform polymerization. The reaction was carried out at 60° C. during the addition. Once the addition was complete, a further 3 hours of stirring was performed at 70° C., and then the reaction was ended to yield a water dispersion containing a particulate binder (α) as an acrylic polymer. The obtained particulate binder (α) had a volume-average particle diameter of 0.25 μm and a glass-transition temperature of −40° C.

<Production of Slurry Composition (Composition for Functional Layer)>

A pre-mixing slurry was obtained by adding 0.5 parts of polyacrylic acid as a water-soluble polymer to 100 parts of alumina (AKP3000 produced by Sumitomo Chemical Co., Ltd.; volume-average particle diameter: 0.7 μm) as inorganic particles, further adding deionized water such that the solid content concentration was 55 weight %, and performing mixing using a ball mill.

Sodium dodecylbenzenesulfonate (NEOPELEX G-15 produced by Kao Corporation) as a dispersant was added in an amount of 0.2 parts relative to 100 parts of the particulate polymer. In addition, 6 parts in terms of solid content of the water dispersion containing the binder (α) and 1.5 parts of carboxymethyl cellulose as a thickener relative to 100 parts of the particulate polymer were mixed such that the solid content concentration was 40 weight %, and then the resultant mixture was added to the pre-mixing slurry obtained as described above. Deionized water was also added to adjust the solid content concentration to 40 weight % and yield a slurry composition (composition for a functional layer).

Note that the volume ratio of the inorganic particles (alumina) and the particulate polymer (inorganic particles/particulate polymer) in the slurry composition was 70/30.

<Production of Functional Layer-Equipped Separator (Laminate)>

A microporous membrane (thickness: 12 μm) made of polyethylene was prepared as a separator substrate. The composition for a functional layer (slurry composition) was applied onto one side of the prepared separator substrate by bar coating. Drying of the coating film was then performed at 50° C. The same operations as described above were also performed with respect to the other side of the separator substrate to produce a functional layer-equipped separator (laminate for an electrochemical device) that included functional layers at both sides of the separator substrate. The volume-average particle diameter of the particulate polymer in a functional layer included in the obtained laminate was 6.0 μm. Moreover, the thickness of a non-conductive heat-resistant particle layer included in a functional layer included in the obtained laminate was 2.0 μm.

<Production of Positive Electrode>

A slurry composition for a positive electrode was produced by mixing 100 parts of $LiCoO_2$ (volume-average particle diameter: 12 μm) as a positive electrode active material, 2 parts of acetylene black (HS-100 produced by Denka Company Limited) as a conductive material, 2 parts in terms of solid content of polyvinylidene fluoride (#7208 produced by Kureha Corporation) as a binder for a positive electrode mixed material layer, and N-methylpyrrolidone as a solvent, adjusting the total solid content concentration to 70 mass %, and mixing these materials in a planetary mixer.

The slurry composition for a positive electrode was applied onto aluminum foil of 10 μm in thickness serving as a current collector by a comma coater such as to have a thickness after drying of approximately 150 μm. The slurry composition for a positive electrode was dried by conveying the aluminum foil inside a 60° C. oven for 2 minutes at a speed of 0.5 m/min. Thereafter, 2 minutes of heat treatment was performed at 120° C. to obtain a pre-pressing positive electrode web. The pre-pressing positive electrode web was rolled by roll pressing to obtain a post-pressing positive electrode including a positive electrode mixed material layer (thickness: 60 μm).

<Production of Negative Electrode>

A 5 MPa pressure-resistant vessel equipped with a stirrer was charged with 33 parts of 1,3-butadiene, 3.5 parts of itaconic acid, 63.5 parts of styrene, 0.4 parts of sodium dodecylbenzenesulfonate as an emulsifier, 150 parts of deionized water, and 0.5 parts of potassium persulfate as a polymerization initiator. These materials were thoroughly stirred and were then heated to 50° C. to initiate polymerization. At the point at which the polymerization conversion rate reached 96%, cooling was performed to quench the reaction and yield a mixture containing a binder (SBR) for a negative electrode mixed material layer. The mixture containing the binder for a negative electrode mixed material layer was adjusted to pH 8 through addition of 5% sodium hydroxide aqueous solution, and was then subjected to thermal-vacuum distillation to remove unreacted monomer. Thereafter, the mixture was cooled to 30° C. or lower to obtain a water dispersion containing the target binder for a negative electrode mixed material layer.

After mixing 96 parts of artificial graphite (volume-average particle diameter: 15.6 μm) as a negative electrode active material, 1.0 parts in terms of solid content of a 2% aqueous solution of carboxymethyl cellulose sodium salt (MAC350HC produced by Nippon Paper Industries Co., Ltd.) as a viscosity modifier, and deionized water and adjusting the solid content concentration thereof to 68%, a further 60 minutes of mixing was performed at 25° C. The solid content concentration was further adjusted to 62% with deionized water, and a further 15 minutes of mixing was performed at 25° C. to obtain a mixture. Deionized water and 1.5 parts in terms of solid content of the water dispersion containing the binder for a negative electrode mixed material layer were added to this mixture, the final solid content concentration was adjusted to 52%, and a further 10 minutes of mixing was performed to obtain a mixture. This mixture was subjected to defoaming under reduced pressure to yield a slurry composition for a negative electrode having good fluidity.

The slurry composition for a negative electrode was applied onto copper foil of 6 μm in thickness serving as a current collector by a comma coater such as to have a thickness after drying of approximately 150 μm. The slurry composition for a negative electrode was dried by conveying the copper foil inside a 60° C. oven for 2 minutes at a speed of 0.5 m/min. Thereafter, 2 minutes of heat treatment was performed at 120° C. to obtain a pre-pressing negative electrode web. The pre-pressing negative electrode web was rolled by roll pressing to obtain a post-pressing negative electrode including a negative electrode mixed material layer (thickness: 80 μm).

The functional layer-equipped separator, positive electrode, and negative electrode obtained as described above were used to evaluate process adhesiveness, adhesiveness after electrolyte solution wetting (wet adhesiveness), and blocking resistance. The results are shown in Table 1.

<Production of Lithium Ion Secondary Battery>

The post-pressing positive electrode produced as described above was cut out as a rectangle of 49 cm×5 cm and was placed with the surface at the positive electrode mixed material layer-side thereof facing upward. The functional layer-equipped separator was cut out as 120 cm×5.5 cm and was then arranged on the positive electrode mixed material layer such that the positive electrode was positioned at one longitudinal direction side of the functional layer-equipped separator. In addition, the post-pressing negative electrode produced as described above was cut out as a rectangle of 50 cm×5.2 cm and was arranged on the functional layer-equipped separator such that the surface at the negative electrode mixed material layer-side thereof faced toward the functional layer-equipped separator and such that the negative electrode was positioned at the other longitudinal direction side of the functional layer-equipped separator. During the above, the functional layer-equipped separator was arranged such that a front surface thereof faced the positive electrode and a rear surface thereof faced the negative electrode. The resultant laminate was wound by a winding machine to obtain a roll.

This roll was pressed into a flat form at 50° C. and 1 MPa, was subsequently enclosed in an aluminum packing case serving as a battery case, and then electrolyte solution (solvent: ethylene carbonate/diethyl carbonate/vinylene carbonate (volume ratio)=68.5/30/1.5; electrolyte: $LiPF_6$ of 1 mol in concentration) was injected such that no air remained. An opening of the aluminum packing case was then closed by heat sealing at a temperature of 150° C. to thereby produce a wound lithium ion secondary battery having a capacity of 800 mAh.

The obtained lithium ion secondary battery was used to evaluate cycle characteristics and internal resistance characteristics. The results are shown in Table 1.

Example 2

A particulate polymer, a binder (α), a slurry composition, a functional layer-equipped separator, a positive electrode, and a negative electrode were produced and a lithium ion secondary battery was obtained in the same way as in Example 1 with the exception that the particulate polymer was produced by suspension polymerization described below. Various measurements and evaluations were performed in the same way as in Example 1. The results are shown in Table 1.

[Suspension Polymerization]

The monomer composition (A) produced in Example 1 was added to the colloidal dispersion liquid (A) containing magnesium hydroxide that was produced in Example 1, was stirred therewith, and then 2.0 parts of t-butyl peroxy-2-ethylhexanoate (PERBUTYL O produced by NOF Corporation) as a polymerization initiator and 1.0 parts of the chain transfer agent (A) were added to obtain a mixture. The obtained mixture was subjected to 1 minute of high-shear stirring at a rotation speed of 15,000 rpm using an inline emulsifying/dispersing device (CAVITRON produced by Pacific Machinery & Engineering Co., Ltd.) so as to form droplets of the monomer composition (A) in the colloidal dispersion liquid (A) containing magnesium hydroxide.

The magnesium hydroxide-containing colloidal dispersion liquid (A) in which droplets of the monomer composition (A) had been formed was loaded into a reactor and was heated to 90° C. At the point at which 10 minutes had passed after heating, 1.0 parts of the chain transfer agent (A) was added into the reactor. Thereafter, a polymerization reaction was performed for 5 hours to yield a water dispersion containing a particulate polymer. The obtained particulate polymer was confirmed to include a dithioester structure as a result of measurement of the particulate polymer by FT-IR.

Example 3

A particulate polymer, a binder (α), a slurry composition, a functional layer-equipped separator, a positive electrode, and a negative electrode were produced and a lithium ion secondary battery was obtained in the same way as in Example 1 with the exception that the particulate polymer was produced by suspension polymerization described below. Various measurements and evaluations were performed in the same way as in Example 1. The results are shown in Table 1.

[Suspension Polymerization]

The monomer composition (A) produced in Example 1 was added to the colloidal dispersion liquid (A) containing magnesium hydroxide that was produced in Example 1, was stirred therewith, and then 2.0 parts of t-butyl peroxy-2-ethylhexanoate (PERBUTYL O produced by NOF Corporation) as a polymerization initiator and 0.66 parts of the chain transfer agent (A) were added to obtain a mixture. The obtained mixture was subjected to 1 minute of high-shear stirring at a rotation speed of 15,000 rpm using an inline emulsifying/dispersing device (CAVITRON produced by Pacific Machinery & Engineering Co., Ltd.) so as to form droplets of the monomer composition (A) in the colloidal dispersion liquid (A) containing magnesium hydroxide.

The magnesium hydroxide-containing colloidal dispersion liquid (A) in which droplets of the monomer composition (A) had been formed was loaded into a reactor and was heated to 90° C. At the point at which 10 minutes had passed after heating, 0.66 parts of the chain transfer agent (A) was added into the reactor. Moreover, once a further 10 minutes had passed, 0.66 parts of the chain transfer agent (A) was added into the reactor. Thereafter, a polymerization reaction was performed for 5 hours to yield a water dispersion containing a particulate polymer. The obtained particulate polymer was confirmed to include a dithioester structure as a result of measurement of the particulate polymer by FT-IR.

Example 4

A particulate polymer, a binder (α), a slurry composition, a functional layer-equipped separator, a positive electrode, and a negative electrode were produced and a lithium ion secondary battery was obtained in the same way as in Example 1 with the exception that a chain transfer agent (B) (methyl 4-cyano-4-[(dodecylsulfanylthiocarbonyl)sulfanyl] pentanoate; 356-40753 produced by FUJIFILM Wako Pure Chemical Corporation) was used instead of the chain transfer agent (A) in production of the particulate polymer. Various measurements and evaluations were performed in the same way as in Example 1. The results are shown in Table 1. The obtained particulate polymer was confirmed to include a dithioester structure as a result of measurement of the particulate polymer by FT-IR.

Example 5

A particulate polymer, a binder (α), a slurry composition, a functional layer-equipped separator, a positive electrode, and a negative electrode were produced and a lithium ion secondary battery was obtained in the same way as in Example 1 with the exception that a chain transfer agent (C) (4-cyano [(dodecylsulfanylthiocarbonyl)sulfanyl]pentanoic acid; 036-24643 produced by FUJIFILM Wako Pure Chemical Corporation) was used instead of the chain transfer agent (A) in production of the particulate polymer. Various measurements and evaluations were performed in the same way as in Example 1. The results are shown in Table 1. The obtained particulate polymer was confirmed to include a dithioester structure as a result of measurement of the particulate polymer by FT-IR.

Example 6

A particulate polymer, a binder (α), a slurry composition, a functional layer-equipped separator, a positive electrode, and a negative electrode were produced and a lithium ion secondary battery was obtained in the same way as in Example 1 with the exception that 70 parts of methyl methacrylate and 30 parts of 2-ethylhexyl acrylate were used instead of 70 parts of styrene and 30 parts of butyl acrylate in production of the particulate polymer. Various measurements and evaluations were performed in the same way as in Example 1. The results are shown in Table 1. The obtained particulate polymer was confirmed to include a dithioester structure as a result of measurement of the particulate polymer by FT-IR.

Example 7

A particulate polymer, a binder (α), a slurry composition, a functional layer-equipped separator, a positive electrode, and a negative electrode were produced and a lithium ion secondary battery was obtained in the same way as in Example 1 with the exception that boehmite (H43M produced by Showa Denko K.K.; volume-average particle diameter: 0.8 μm) was used instead of alumina as inorganic particles in production of the slurry composition. Various measurements and evaluations were performed in the same way as in Example 1. The results are shown in Table 1.

Example 8

A particulate polymer, a binder (α), a slurry composition, a functional layer-equipped separator, a positive electrode, and a negative electrode were produced and a lithium ion secondary battery was obtained in the same way as in Example 1 with the exception that barium sulfate (TS-2 produced by Takehara Kagaku Kogyo Co., Ltd.; volume-average particle diameter: 0.3 μm) was used instead of alumina as inorganic particles in production of the slurry composition. Various measurements and evaluations were performed in the same way as in Example 1. The results are shown in Table 1.

Example 9

A particulate polymer, a binder (α), a slurry composition, a functional layer-equipped separator, a positive electrode, and a negative electrode were produced and a lithium ion secondary battery was obtained in the same way as in Example 1 with the exception that magnesium hydroxide (MAGSEEDS X-6F produced by Konoshima Chemical Co., Ltd.; volume-average particle diameter: 0.7 μm) was used instead of alumina as inorganic particles in production of the slurry composition. Various measurements and evaluations were performed in the same way as in Example 1. The results are shown in Table 1.

Example 10

A particulate polymer, a binder (α), a slurry composition, a functional layer-equipped separator, a positive electrode, and a negative electrode were produced and a lithium ion secondary battery was obtained in the same way as in Example 1 with the exception that inorganic particles compounded as non-conductive heat-resistant particles in production of the slurry composition were changed to organic particles that were produced as described below. Various measurements and evaluations were performed in the same way as in Example 1. The results are shown in Table 1.

<Production of Organic Particle Dispersion Liquid>

(1) Production of Monomer Composition for Seed Particles

A reactor A including a stirrer was charged with 0.2 parts of sodium dodecyl sulfate, 0.30 parts of ammonium persulfate, and 180 parts of deionized water. These materials were mixed to obtain a mixture and were heated to 65° C. Meanwhile, a monomer composition for seed particles was produced in a separate vessel by mixing 80.0 parts of n-butyl acrylate as a monofunctional (meth)acrylic acid ester monomer, 10.0 parts of methacrylic acid as an acidic group-containing monomer, 10.0 parts of acrylonitrile as a nitrile group-containing monomer, 0.6 parts of sodium dodecyl sulfate, and 40 parts of deionized water.

This monomer composition for seed particles was continuously added into the above-described reactor A over 4 hours to perform a polymerization reaction. A temperature of 65° C. was maintained inside the reactor during continuous addition of the monomer composition for seed particles. Once the continuous addition was complete, the polymerization reaction was continued for a further 3 hours at 80° C. In this manner, a water dispersion of seed particles was obtained. The volume-average particle diameter of the seed particles, as measured in the same manner as for measurement of the volume-average particle diameter of a particulate polymer or binder produced by emulsion polymerization, was 120 nm.

(2) Seeded Polymerization of Polyfunctional Monomer

Next, a reactor including a stirrer was charged with 20 parts in terms of solid content of the water dispersion of the seed particles described above (among which, 16 parts was n-butyl acrylate units, 2 parts was methacrylic acid units, and 2 parts was acrylonitrile units), 80 parts of ethylene glycol dimethacrylate (Kyoeisha Chemical Co., Ltd.; product name: LIGHT ESTER EG) as a polyfunctional monomer, 0.8 parts of sodium dodecylbenzenesulfonate, and 3.2 parts of t-butyl peroxy-2-ethylhexanoate (produced by NOF Corporation; product name: PERBUTYL O) as a polymerization initiator, 160 parts of deionized water was added thereto, and these materials were stirred at 35° C. for 12 hours to cause complete absorption of the polyfunctional monomer and the polymerization initiator by the seed particles. Thereafter, a temperature of 40° C. was maintained inside the reactor while performing dropwise addition of ascorbic acid as a reductant over 1 hour and then performing a polymerization reaction (seeded polymerization) for a further 2 hours to yield an organic particle dispersion liquid of organic particles dispersed in water. The obtained organic particles had a volume-average particle diameter of 200 nm and a glass-transition temperature of higher than 200° C. Note that measurement of the volume-average particle diameter and the glass-transition temperature of the organic particles was performed by the same methods as for measurement of the volume-average particle diameter of a particulate polymer or binder produced by emulsion polymerization.

Example 11

A particulate polymer, a binder (α), a slurry composition, a functional layer-equipped separator, a positive electrode, and a negative electrode were produced and a lithium ion secondary battery was obtained in the same way as in Example 1 with the exception that the polymerization initiator was set as 0.25 parts in production of the particulate polymer. Various measurements and evaluations were performed in the same way as in Example 1. The results are shown in Table 1. The obtained particulate polymer was confirmed to include a dithioester structure as a result of measurement of the particulate polymer by FT-IR.

Example 12

A particulate polymer, a binder (α), a slurry composition, a functional layer-equipped separator (functional layer thickness: 1.0 μm), a positive electrode, and a negative electrode were produced and a lithium ion secondary battery was obtained in the same way as in Example 1 with the exception that the particulate polymer was produced by emulsion polymerization described below and that the slurry composition (composition for a functional layer) was produced as described below. Various measurements and evaluations were performed in the same way as in Example 1. The results are shown in Table 1.

[Emulsion Polymerization]

A reactor including a stirrer was charged with 100 parts of the monomer composition (A) produced in Example 1, 1 part of the chain transfer agent (A), 0.3 parts of sodium dodecylbenzenesulfonate as an emulsifier, 150 parts of deionized water, and 0.3 parts of ammonium persulfate as a polymerization initiator. These materials were thoroughly stirred and were then heated to 70° C. to initiate polymerization. At the point at which the polymerization conversion rate reached 96%, cooling was performed to quench the reaction and yield a water dispersion containing a particulate polymer. The obtained particulate polymer was confirmed to include a dithioester structure as a result of measurement of the particulate polymer by FT-IR.

<Production of Slurry Composition (Composition for Functional Layer)>

A mixture was obtained by mixing 1,000 parts in terms of solid content of the water dispersion of the particulate polymer produced by emulsion polymerization described above and 1 part of EMULGEN 120 (produced by Kao Corporation) as a wetting agent relative to 65 parts (in terms of solid content) of the water dispersion of the binder (α) in a stirring vessel.

Deionized water was also added to the obtained mixture so as to adjust the solid content concentration to 10 mass % and yield a slurry composition (composition for a functional layer).

Comparative Example 1

A particulate polymer, a binder (α), a slurry composition, a functional layer-equipped separator, a positive electrode, and a negative electrode were produced and a lithium ion secondary battery was obtained in the same way as in Example 1 with the exception that a chain transfer agent was not added in production of the particulate polymer. Various measurements and evaluations were performed in the same way as in Example 1. The results are shown in Table 1.

Comparative Example 2

A particulate polymer, a binder (α), a slurry composition, a functional layer-equipped separator, a positive electrode, and a negative electrode were produced and a lithium ion secondary battery was obtained in the same way as in Example 12 with the exception that a chain transfer agent was not added in production of the particulate polymer. Various measurements and evaluations were performed in the same way as in Example 1. The results are shown in Table 1.

Note that in Table 1:
"BA" indicates n-butyl acrylate;
"ST" indicates styrene;
"2EHA" indicates 2-ethylhexyl acrylate;
"MMA" indicates methyl methacrylate;
"MAA" indicates methacrylic acid;
"AN" indicates acrylonitrile;
"AMA" indicates allyl methacrylate; and
"AGE" indicates allyl glycidyl ether.

TABLE 1

| | | | Example 1 | Example 2 | Example 3 | Example 4 | Example 5 |
|---|---|---|---|---|---|---|---|
| Functional layer for electrochemical device | Particulate polymer | Chemical composition | BA/ST | BA/ST | BA/ST | BA/ST | BA/ST |
| | | Chemical composition ratio [mass] | 30/70 | 30/70 | 30/70 | 30/70 | 30/70 |
| | | Dithioester structure | Yes | Yes | Yes | Yes | Yes |
| | | Type of chain transfer agent | Chain transfer agent (A) | Chain transfer agent (A) | Chain transfer agent (A) | Chain transfer agent (B) | Chain transfer agent (C) |
| | | Additive amount of chain transfer agent (parts by mass/100 parts by mass of monomer composition) | 2 | 2 | 2 | 2 | 2 |
| | | Mode of addition of chain transfer agent | Single addition | Two-portion addition | Three-portion addition | Single addition | Single addition |
| | | Molecular weight distribution (Mw/Mn) | 1.2 | 1.6 | 2.4 | 1.2 | 1.2 |
| | | Weight-average molecular weight Mw | 100000 | 105000 | 110000 | 100000 | 100000 |
| | | Glass-transition temperature (° C.) | 65 | 65 | 65 | 65 | 65 |
| | | Volume-average particle diameter (μm) (in composition for functional layer) | 6 | 6 | 6 | 6 | 6 |
| | | Volume-average particle diameter (μm) (in functional layer) | 6.0 | 6.0 | 6.0 | 6.0 | 6.0 |
| | | Polymerization method | Suspension polymerization | Suspension polymerization | Suspension polymerization | Suspension polymerization | Suspension polymerization |
| | Binder | Chemical composition | BA/MAA/AN/AMA/AGE | BA/MAA/AN/AMA/AGE | BA/MAA/AN/AMA/AGE | BA/MAA/AN/AMA/AGE | BA/MAA/AN/AMA/AGE |
| | | Glass-transition temperature (° C.) | −40 | −40 | −40 | −40 | −40 |
| | Non-conductive heat-resistant particles | Type | Alumina | Alumina | Alumina | Alumina | Alumina |
| | | Volume-average particle diameter (μm) | 0.7 | 0.7 | 0.7 | 0.7 | 0.7 |
| | Volume ratio in composition for functional layer (non-conductive heat-resistant particles/particulate polymer) | | 70/30 | 70/30 | 70/30 | 70/30 | 70/30 |
| | Thickness of non-conductive heat-resistant particle layer (μm) | | 2.0 | 2.0 | 2.0 | 2.0 | 2.0 |
| Evaluation | Functional layer characteristics | Process adhesiveness | A | A | A | A | A |
| | | Blocking resistance | A | B | B | A | A |
| | | Wet adhesiveness | A | A | A | A | A |
| | Battery characteristics | Internal resistance characteristics | A | A | B | A | A |
| | | Cycle characteristics | A | A | A | A | A |
| | | | Example 6 | Example 7 | Example 8 | Example 9 | Example 10 |
| Functional layer for electrochemical device | Particulate polymer | Chemical composition | 2EHA/MMA | BA/ST | BA/ST | BA/ST | BA/ST |
| | | Chemical composition ratio [mass] | 30/70 | 30/70 | 30/70 | 30/70 | 30/70 |
| | | Dithioester structure | Yes | Yes | Yes | Yes | Yes |
| | | Type of chain transfer agent | Chain transfer agent (A) | Chain transfer agent (A) | Chain transfer agent (A) | Chain transfer agent (A) | Chain transfer agent (A) |
| | | Additive amount of chain transfer agent (parts by mass/100 parts by mass of monomer composition) | 2 | 2 | 2 | 2 | 2 |
| | | Mode of addition of chain transfer agent | Single addition | Single addition | Single addition | Single addition | Single addition |
| | | Molecular weight distribution (Mw/Mn) | 1.2 | 1.2 | 1.2 | 1.2 | 1.2 |
| | | Weight-average molecular weight Mw | 110000 | 100000 | 100000 | 100000 | 100000 |
| | | Glass-transition temperature (° C.) | 65 | 65 | 65 | 65 | 65 |

TABLE 1-continued

| | | | | | | | |
|---|---|---|---|---|---|---|---|
| | | Volume-average particle diameter (μm) (in composition for functional layer) | 6 | 6 | 6 | 6 | 6 |
| | | Volume-average particle diameter (μm) (in functional layer) | 6.0 | 6.0 | 6.0 | 6.0 | 6.0 |
| | | Polymerization method | Suspension polymerization | Suspension polymerization | Suspension polymerization | Suspension polymerization | Suspension polymerization |
| | Binder | Chemical composition | BA/MAA/AN/AMA/AGE | BA/MAA/AN/AMA/AGE | BA/MAA/AN/AMA/AGE | BA/MAA/AN/AMA/AGE | BA/MAA/AN/AMA/AGE |
| | | Glass-transition temperature (° C.) | −40 | −40 | −40 | −40 | −40 |
| | Non-conductive heat-resistant particles | Type | Alumina | Boehmite | Barium sulfate | Magnesium hydroxide | Organic particles |
| | | Volume-average particle diameter (μm) | 0.7 | 0.8 | 0.3 | 0.7 | 0.2 |
| | Volume ratio in composition for functional layer (non-conductive heat-resistant particles/particulate polymer) | | 70/30 | 70/30 | 70/30 | 70/30 | 70/30 |
| | Thickness of non-conductive heat-resistant particle layer (μm) | | 2.0 | 2.0 | 2.0 | 2.0 | 2.0 |
| Evaluation | Functional layer characteristics | Process adhesiveness | A | A | A | A | A |
| | | Blocking resistance | A | A | A | A | A |
| | | Wet adhesiveness | A | A | A | A | A |
| | Battery characteristics | Internal resistance characteristics | A | A | A | A | B |
| | | Cycle characteristics | A | A | A | A | B |

| | | | Example 11 | Example 12 | Comparative Example 1 | Comparative Example 2 |
|---|---|---|---|---|---|---|
| Functional layer for electrochemical device | Particulate polymer | Chemical composition | BA/ST | BA/ST | BA/ST | BA/ST |
| | | Chemical composition ratio [mass] | 30/70 | 30/70 | 30/70 | 30/70 |
| | | Dithioester structure | Yes | Yes | No | No |
| | | Type of chain transfer agent | Chain transfer agent (A) | Chain transfer agent (A) | — | — |
| | | Additive amount of chain transfer agent (parts by mass/100 parts by mass of monomer composition) | 2 | 1 | — | — |
| | | Mode of addition of chain transfer agent | Single addition | Single addition | — | — |
| | | Molecular weight distribution (Mw/Mn) | 1.9 | 1.7 | 4.3 | 4.3 |
| | | Weight-average molecular weight Mw | 400000 | 90000 | 170000 | 90000 |
| | | Glass-transition temperature (° C.) | 65 | 65 | 65 | 65 |
| | | Volume-average particle diameter (μm) (in composition for functional layer) | 6 | 0.5 | 6 | 0.5 |
| | | Volume-average particle diameter (μm) (in functional layer) | 6.0 | 0.5 | 6.0 | 0.5 |
| | | Polymerization method | Suspension polymerization | Emulsion polymerization | Suspension polymerization | Emulsion polymerization |
| | Binder | Chemical composition | BA/MAA/AN/AMA/AGE | BA/MAA/AN/AMA/AGE | BA/MAA/AN/AMA/AGE | BA/MAA/AN/AMA/AGE |
| | | Glass-transition temperature (° C.) | −40 | −40 | −40 | −40 |
| | Non-conductive heat-resistant particles | Type | Alumina | — | Alumina | — |
| | | Volume-average particle diameter (μm) | 0.7 | — | 0.7 | — |
| | Volume ratio in composition for functional layer (non-conductive heat-resistant particles/particulate polymer) | | 70/30 | — | 70/30 | — |
| | Thickness of non-conductive heat-resistant particle layer (μm) | | 2.0 | — | 2.0 | — |
| Evaluation | Functional layer characteristics | Process adhesiveness | B | A | B | B |
| | | Blocking resistance | A | B | C | D |
| | | Wet adhesiveness | B | A | C | C |
| | Battery characteristics | Internal resistance characteristics | A | B | C | D |
| | | Cycle characteristics | B | A | B | C |

It can be seen from the results in Table 1 that in Examples 1 to 12 in which the molecular weight distribution (Mw/Mn) of the particulate polymer had a value that was within a range of not less than 1.0 and not more than 3.0, process adhesiveness and blocking resistance were excellent, and electrochemical characteristics of an electrochemical device were also excellent. In contrast, it can be seen that although process adhesiveness was good in Comparative Example 1 in which the molecular weight distribution (Mw/Mn) of the particulate polymer had a value exceeding 3.0, blocking resistance and internal resistance characteristics were poor. It can also be seen that although process adhesiveness was good in Comparative Example 2 in which the molecular weight distribution (Mw/Mn) of the particulate polymer had a value exceeding 3.0 and in which non-conductive heat-resistant particles were not compounded, blocking resistance, internal resistance characteristics, and cycle characteristics were even poorer.

INDUSTRIAL APPLICABILITY

According to the present disclosure, it is possible to provide a composition for an electrochemical device functional layer with which it is possible to form a functional layer for an electrochemical device that can impart excellent process adhesiveness and blocking resistance to an electrochemical device member such as an electrode or a separator and that can cause an electrochemical device to display excellent electrochemical characteristics.

Moreover, according to the present disclosure, it is possible to provide a laminate for an electrochemical device including a functional layer for an electrochemical device that can impart excellent process adhesiveness and blocking resistance to an electrochemical device member such as an electrode or a separator and that can cause an electrochemical device to display excellent electrochemical characteristics.

Furthermore, according to the present disclosure, it is possible to provide an electrochemical device that can display excellent electrochemical characteristics.

The invention claimed is:

1. A composition for an electrochemical device functional layer comprising a particulate polymer and a binder, wherein the particulate polymer has a molecular weight distribution, expressed by weight-average molecular weight (Mw)/number-average molecular weight (Mn), of not less than 1.0 and not more than 3.0, the binder has a glass-transition temperature of −100° C. or higher and lower than a glass-transition temperature of the particulate polymer, and the particulate polymer includes a dithioester structure.

2. The composition for an electrochemical device functional layer according to claim 1, wherein the particulate polymer has a glass-transition temperature of not lower than 25° C. and not higher than 90° C.

3. The composition for an electrochemical device functional layer according to claim 1, wherein the particulate polymer includes a (meth)acrylic acid ester monomer unit.

4. The composition for an electrochemical device functional layer according to claim 1, wherein the binder is formed of a polymer that includes a (meth)acrylic acid ester monomer unit.

5. The composition for an electrochemical device functional layer according to claim 1, further comprising non-conductive heat-resistant particles.

6. The composition for an electrochemical device functional layer according to claim 5, wherein the non-conductive heat-resistant particles include inorganic particles.

7. The composition for an electrochemical device functional layer according to claim 6, wherein the inorganic particles contain at least one selected from the group consisting of alumina, boehmite, barium sulfate, and magnesium hydroxide.

8. A laminate for an electrochemical device comprising: a substrate; and a functional layer for an electrochemical device formed on the substrate, wherein the functional layer for an electrochemical device is formed using the composition for an electrochemical device functional layer according to claim 1.

9. An electrochemical device comprising the laminate for an electrochemical device according to claim 8.

* * * * *